(12) United States Patent
Breed et al.

(10) Patent No.: US 10,397,042 B2
(45) Date of Patent: *Aug. 27, 2019

(54) METHOD AND APPARATUS FOR AUTOMATION AND ALARM ARCHITECTURE

(71) Applicant: TYCO SAFETY PRODUCTS CANADA LTD., Concord (CA)

(72) Inventors: Jason A. Breed, Richmond Hill (CA); Andrei Bucsa, Toronto (CA); Greg Hill, Newmarket (CA)

(73) Assignee: TYCO SAFETY PRODUCTS CANADA LTD., Concord, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 16/109,979

(22) Filed: Aug. 23, 2018

(65) Prior Publication Data

US 2018/0367366 A1    Dec. 20, 2018

Related U.S. Application Data

(63) Continuation of application No. 14/824,175, filed on Aug. 12, 2015, now Pat. No. 10,084,638.

(Continued)

(51) Int. Cl.
*G06F 15/16*       (2006.01)
*H04L 12/24*       (2006.01)
(Continued)

(52) U.S. Cl.
CPC ............ *H04L 41/06* (2013.01); *G08B 25/006* (2013.01); *H04L 12/2825* (2013.01);
(Continued)

(58) Field of Classification Search
CPC . H04L 41/06; H04L 12/2825; H04L 41/0813; H04L 67/12; H04L 67/2819
See application file for complete search history.

(56) References Cited

U.S. PATENT DOCUMENTS 5,475,364 A    12/1995  Kenet
5,568,535 A    10/1996  Sheffer et al.
(Continued)

FOREIGN PATENT DOCUMENTS

CA    2885731 A1    3/2014

OTHER PUBLICATIONS

International Search Report issued in PCT/CA2015/050761, dated Nov. 3, 2015 (4 pages).

(Continued)

*Primary Examiner* — Moustafa M Meky
(74) *Attorney, Agent, or Firm* — Arent Fox LLP

(57) ABSTRACT

A method and system architecture for automation and alarm systems is provided. The system architecture is hierarchically organized, allowing devices to process system data differently at different levels of the hierarchy. Moreover, different devices at the same level of the hierarchy may employ different or custom configurations, allowing for context-dependent algorithms to be deployed in the system. The configuration of each device in the system is defined by a set of rules, filters, thresholds, and other criteria, which are pushed to a device from other devices in the hierarchy. Accordingly, the configuration of each device is dynamically updated as information is learned about the context in which the device is deployed, and as more advanced algorithms and configurations are developed.

20 Claims, 13 Drawing Sheets

Related U.S. Application Data

(60) Provisional application No. 62/036,795, filed on Aug. 13, 2014, provisional application No. 62/059,410, filed on Oct. 3, 2014.

(51) Int. Cl.
*G08B 25/00* (2006.01)
*H04L 12/28* (2006.01)
*H04L 29/08* (2006.01)

(52) U.S. Cl.
CPC .......... *H04L 41/0813* (2013.01); *H04L 67/12* (2013.01); *H04L 67/2819* (2013.01)

(56) References Cited

U.S. PATENT DOCUMENTS

| | | | |
|---|---|---|---|
| 5,864,286 A | 1/1999 | Right et al. | |
| 6,317,042 B1* | 11/2001 | Engelhorn | G08B 7/062 340/288 |
| 7,971,143 B2* | 6/2011 | Santanche | G06Q 90/00 701/408 |
| 8,248,226 B2 | 8/2012 | Friar | |
| 8,498,864 B1 | 7/2013 | Liang et al. | |
| 8,710,983 B2* | 4/2014 | Malkowski | G08B 13/22 340/539.1 |
| 9,064,389 B1* | 6/2015 | Bernstein | G08C 17/02 |
| 9,372,213 B2* | 6/2016 | Auguste | G01R 21/00 |
| 10,084,638 B2* | 9/2018 | Breed | H04L 41/06 |
| 2001/0056350 A1 | 12/2001 | Calderone et al. | |
| 2003/0062997 A1 | 4/2003 | Naidoo et al. | |
| 2005/0179539 A1 | 8/2005 | Hill et al. | |
| 2006/0143350 A1 | 6/2006 | Miloushev et al. | |
| 2007/0073861 A1 | 3/2007 | Amanuddin et al. | |
| 2007/0146127 A1 | 6/2007 | Stilp et al. | |
| 2007/0249319 A1 | 10/2007 | Faulkner et al. | |
| 2007/0283001 A1 | 12/2007 | Spiess et al. | |
| 2008/0048861 A1 | 2/2008 | Naidoo et al. | |
| 2008/0177683 A1 | 7/2008 | No et al. | |
| 2009/0120653 A1 | 5/2009 | Thomas | |
| 2009/0195382 A1 | 8/2009 | Hall | |
| 2009/0273462 A1 | 11/2009 | Addy | |
| 2010/0031324 A1 | 2/2010 | Strich et al. | |
| 2010/0083356 A1 | 4/2010 | Steckley et al. | |
| 2011/0034176 A1 | 2/2011 | Lord et al. | |
| 2011/0317007 A1 | 12/2011 | Kim | |
| 2012/0032527 A1 | 2/2012 | Weidner et al. | |
| 2012/0154126 A1 | 6/2012 | Cohn et al. | |
| 2012/0229283 A1 | 9/2012 | McKenna | |
| 2013/0150686 A1 | 6/2013 | Fronterhouse et al. | |
| 2013/0212214 A1 | 8/2013 | Lawson et al. | |
| 2013/0215850 A1 | 8/2013 | Zakrzewski | |
| 2014/0115682 A1* | 4/2014 | He | G06F 21/316 726/7 |
| 2014/0139342 A1* | 5/2014 | Brown | G08B 21/12 340/603 |
| 2014/0225603 A1* | 8/2014 | Auguste | G01R 21/00 324/244 |
| 2014/0266684 A1 | 9/2014 | Poder et al. | |
| 2014/0282486 A1 | 9/2014 | Hisamoto et al. | |
| 2014/0340216 A1 | 11/2014 | Puskarich | |
| 2015/0022344 A1 | 1/2015 | Matsuoka et al. | |
| 2015/0118988 A1 | 4/2015 | Shaw | |
| 2015/0170503 A1 | 6/2015 | Wedig et al. | |
| 2015/0253365 A1* | 9/2015 | Auguste | G01R 21/00 324/251 |
| 2015/0313172 A1* | 11/2015 | Johnston | A01J 5/007 119/14.14 |
| 2015/0350303 A1* | 12/2015 | Lin | H04L 67/10 709/203 |
| 2016/0111091 A1 | 4/2016 | Bakish | |
| 2016/0255423 A1* | 9/2016 | Suzuki | H04W 4/046 340/870.16 |

OTHER PUBLICATIONS

International Search Report issued in PCT/CA2015/051000, dated Dec. 8, 2015 (3 pages).

* cited by examiner

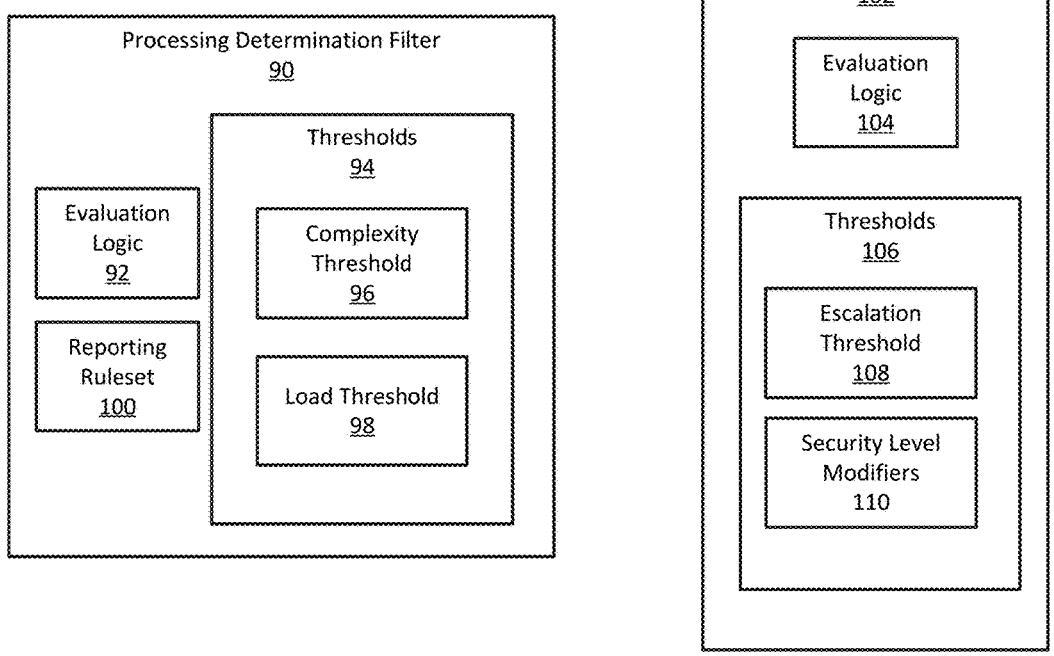
FIG. 8A
FIG. 8B
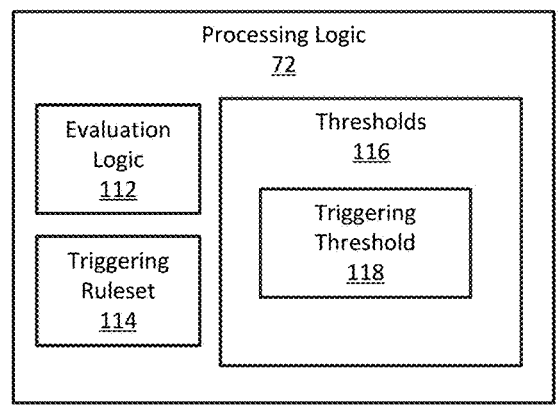
FIG. 9

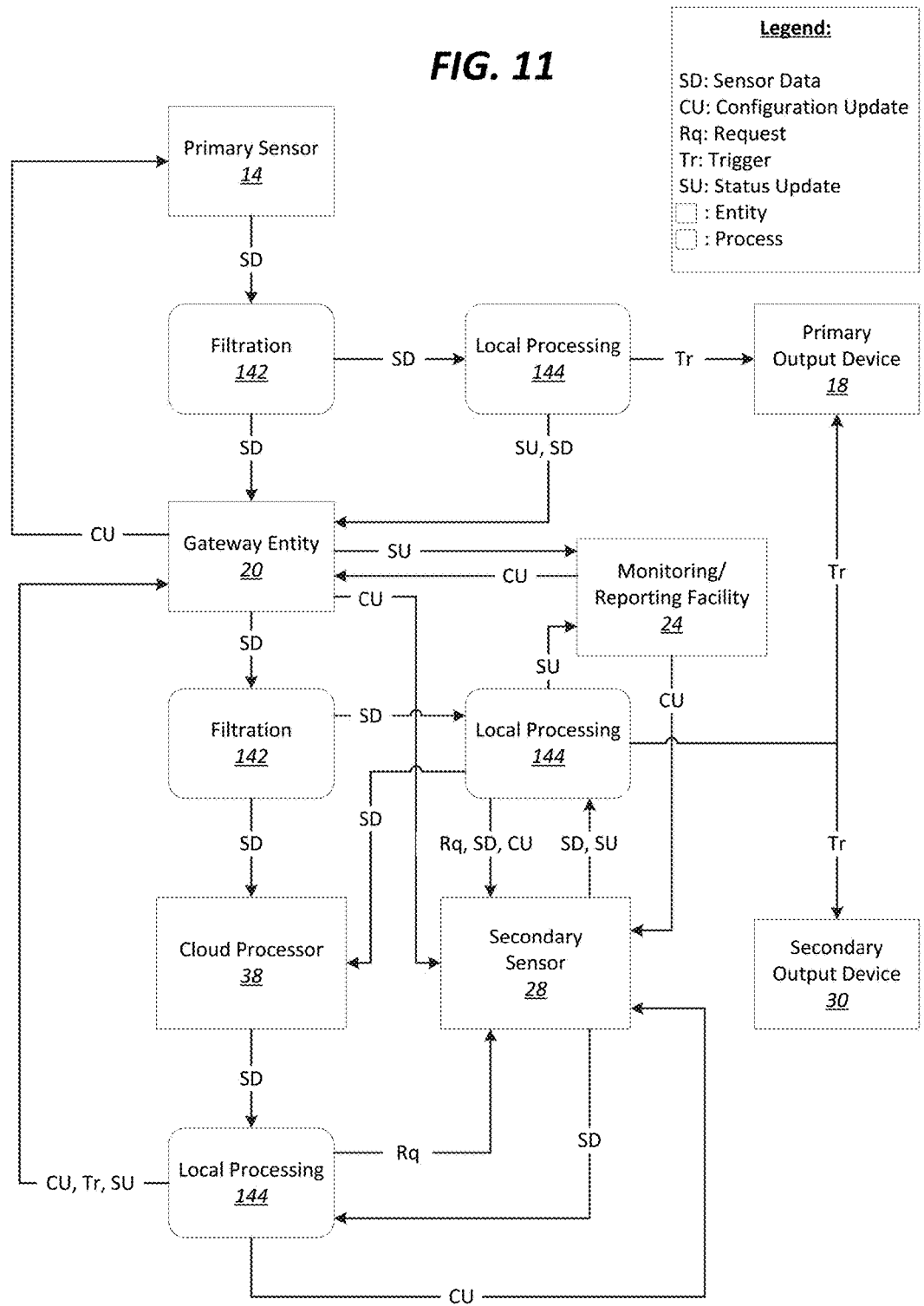

METHOD AND APPARATUS FOR AUTOMATION AND ALARM ARCHITECTURE

CROSS-REFERENCE TO RELATED APPLICATIONS

This application is a continuation of, and claims the benefit of priority to, U.S. patent application Ser. No. 14/824,175, filed Aug. 12, 2015, entitled "Method and Apparatus for Automation and Alarm Architecture," which is a non-provisional of, and claims priority to, U.S. Provisional Patent Application No. 62/036,795, filed on Aug. 13, 2014 and entitled "Wireless Security and Home Automation" and U.S. Provisional Patent Application No. 62/059,410 filed Oct. 3, 2014, and entitled "Wireless Security and Home Automation", all which applications are incorporated by reference in their entirety.

FIELD OF THE DISCLOSURE

The disclosure relates to the field of automation and alarm systems, and more particularly to a method and system architecture for configuring, and analyzing data from, an automation or alarm system.

BACKGROUND OF THE DISCLOSURE

Automation and alarm systems (such as home automation systems, fire alarm systems, and security systems) typically include one or more gateway entities (e.g., alarm panels) that receive information from various sensors distributed through a structured area. In response to particular types of input signals, the sensors or the gateway entity sometimes trigger an action by an output device. For example, a typical fire alarm system includes one or more sensors (e.g., smoke detectors or manually-actuated pull stations, etc.) and output devices (e.g., strobes, sirens, public announcement systems, etc.) operably connected to a gateway entity.

Conventionally, the gateway entity monitors electrical signals associated with each of the sensors for variations that may represent the occurrence of an alarm condition. For example, a variation in a particular electrical signal could represent the detection of smoke by a smoke detector in a corresponding area, or "zone," of a structure in which the smoke detector is located. In response, the gateway entity triggers an alarm mode. The gateway entity responds to such a condition by initiating certain predefined actions, such as activating one or more of the output devices within the monitored structure and/or notifying an external monitoring company.

The gateway entity has limited processing resources, and accordingly can become overwhelmed or slowed if tasked to process data from many sensors. As more sensors are added to the zones monitored by the gateway entity, the demands on the processing resources of the gateway entity grow. In environments with many sensors, this increased demand sometimes requires that additional and/or more powerful gateway entities are deployed, which results in increased cost, complexity, and maintenance requirements.

Furthermore, under some conditions the performance of a particular processing task exceeds the capabilities of the gateway entity. For example, some types of detectors monitor a window for the sound of glass breaking, and forward an audio file containing an anomalous sound to the gateway entity. If the anomalous sound is subtle, or is on the threshold of being classified as the sound of glass breaking, the gateway entity may not have the processing capabilities to accurately or efficiently analyze the sound.

To address some of these problems, existing gateway entities can be upgraded to provide additional processing resources. This solution imposes an additional burden of purchasing and installing the additional processing resources. Moreover, the amount of processing power installed in the gateway entity is typically calibrated to a worst-case processing scenario (i.e., a situation in which processing resources are stressed to a maximum degree). During normal operation, those processing resources might not be required and hence remain unused.

SUMMARY

This disclosure addresses these and other issues with conventional alarm and automation systems. According to exemplary embodiments, some of the processing tasks performed by the system are performed at the sensor level, instead of at the level of the gateway entity. Other processing tasks, which exceed the capabilities of the gateway entity, are sent to a networked processing device (e.g., a processing device in the cloud), or another third-party device. Thus, a hierarchy of processing capabilities is provided, with the sensors forming a lower level, the gateway entity forming an intermediate level, and the cloud/third party processing devices forming a higher level.

By processing some of the data at the sensor level, the gateway entity's processing resources are conserved. Accordingly, the processing resources of the gateway entity (which has more processing resources, compared to the sensors) can be reserved for performing more complex analyses.

Additionally, by moving some of the processing from the gateway entity to the cloud or a third party location, still more complex algorithms can be carried out. Moreover, if a device at a higher level of the hierarchy determines that more information is needed to process received data, the higher-level device requests or is provided with additional information from other devices (e.g., other sensors in the vicinity of the sensor that initially reported an anomaly). This additional information allows for a more holistic analysis and/or response to an emergency situation.

The location at which the processing tasks are handled are established according to configuration settings that define filters, rules, thresholds, processing logic, or other criteria for each device. The configuration settings determine if a processing task is performed at a particular device in the hierarchy, and define when processing tasks should be forwarded for initial or further consideration by another device.

Different algorithms can be employed at different levels of the hierarchy. Thus, relatively simple data processing is performed at the sensor level, while more complicated algorithms are used at higher levels of the hierarchy. Furthermore, different algorithms can be used by devices at the same level of the hierarchy (e.g., different sensors at the sensor level can employ different detection algorithms). Therefore, similar devices deployed in different contexts (e.g., smoke detectors deployed at different locations) employ custom algorithms suited to the device's particular context.

New configuration settings are pushed throughout the architecture (e.g., from the cloud or a third party to the gateway entity, and from the gateway entity to the sensor, or directly from the cloud or a third party to the sensor). Thus, devices are dynamically customized and improved after they are deployed.

According to an exemplary embodiment, a gateway entity performs a method for either processing data locally at the gateway entity, or forwarding the data for processing by another device. The method includes receiving input data from a primary sensor communicatively coupled to the gateway entity. The processor of the gateway entity determines whether to process the data locally at the gateway entity or to forward the data to another device communicatively coupled to the gateway entity, where the other device includes processing logic for processing the input data that is different from processing logic applied by the gateway entity. In some embodiments, the determining is performed by applying a filter to the input data.

If the processor of determines that the input data should be processed locally, the processor processes the data, generates an action to be taken in response to the input data, and forwards the action to an output device communicatively coupled to the gateway entity. The gateway entity requests supplemental data from a secondary sensor distinct from the primary sensor, if the gateway entity determines that supplemental data is necessary. In this embodiment, processing the input data is performed based, at least in part, on the supplemental data.

In some embodiments, the processor aggregates a plurality of input data from a plurality of sensors to generate aggregated data. In these embodiments, processing the input data includes processing the aggregated data.

If the processor determines that the input data should not be processed locally, the gateway entity forwards the input data to the other device, receives an action to be taken in response to the input data from the other device, and forwards the action to the output device. In some embodiments, the sensor is present in a monitored zone, and the output device to which the action is sent is present in an external zone that is distinct from the monitored zone.

If the processor determines that a configuration update is necessary or useful, the processor generates, in response to processing the input data, a configuration update that changes a manner in which the sensor processes future data. The processor forwards the configuration update to the sensor.

According to another embodiment, an apparatus is provided. The apparatus includes a detector for generating input data, a non-transitory computer-readable storage medium, a communication interface communicatively coupled to a connected device that is capable of processing the input data, and a processor.

The non-transitory computer-readable medium stores an identifier of the connected device, and processing logic for processing the input data locally at the apparatus. The connected device also stores connected device processing logic for processing the input data, and the processing logic stored on the apparatus is different than the connected device processing logic. In some embodiments, the storage medium further stores a configuration that is referenced by the processing logic in order to process the input data.

In some embodiments, the apparatus and the connected device are parts of an architecture arranged into a hierarchy having at least two levels, and the connected device is either: another device at a same level of the hierarchy as the apparatus and having specialized processing logic for processing the input data, or is at a higher level of the hierarchy as compared to the apparatus.

The processor is configured to determine whether to process the input data locally at the apparatus. If the processor determines that the input data should be processed locally, the processor processes the data. If the processor determines that the data should not be processed locally, the input data is forwarded to the connected device. If the processor processes the data locally, the processor can make a determination that a result of the processing does not trigger an action but comes within a predefined tolerance of triggering the action. In this embodiment, the input data is forwarded to the connected device for further processing in response to the determination.

Alternatively or in addition, the processor can make a determination that a result of the processing triggers an action by an output device, and the processor generates a trigger for the output device in response to the determination.

In some embodiments, the processor is configured to generate a status update in response to processing the input data, and the communication interface forwards the status update to the connected device to change a status or a monitoring state of an architecture comprising the apparatus and the connected device.

In some embodiments, the communication interface is configured to receive a configuration update from the connected device, and the processor applies the configuration update to change a manner in which the processor processes future data from the detector.

According to another embodiment, an apparatus is provided. The apparatus includes a detector for generating input data, a non-transitory computer-readable storage medium, a communication interface communicatively coupled to a sensor that generates input data, and a processor.

The non-transitory computer-readable storage medium stores an identifier of a cloud processing device capable of processing the input data, and processing logic for processing the input data locally at the apparatus. In some embodiments, the processing logic stored on the storage medium of the apparatus is different than sensor processing logic stored on the sensor from which the data is received. For example, the processing logic stored on the storage medium could cause a different action to be taken in response to the data compared to the sensor processing logic. Alternatively or in addition, the processing logic stored on the storage medium of the apparatus can be different than cloud processing logic stored the cloud processing device to which the data is forwarded. For example, the processing logic stored on the storage medium can cause a different action to be taken in response to the data compared to the cloud processing logic.

The processor is configured to determine whether to process the input data locally at the apparatus or forward the input data to the cloud processing device. If the processor determines that the input data should be processed locally, the processor processes the input data locally by applying the processor logic. If the processor determines that the input data should be processed at the cloud processing device, the input data is forwarded to the cloud processing device.

In some embodiments, the processing logic is configured to generate a configuration update in response to the input data. The configuration update changes a manner in which the sensor processes future data. In these embodiments, the communication interface forwards the configuration update to the sensor. Alternatively or in addition, the communication interface receives a configuration update from the cloud processing device. The configuration update changes a manner in which the sensor processes future data. In these embodiments, the communication interface forwards the configuration update to the sensor.

These and other embodiments are described in more detail below.

BRIEF DESCRIPTION OF THE DRAWINGS

By way of example, specific exemplary embodiments of the disclosed system and method will now be described, with reference to the accompanying drawings, in which:

FIGS. 6-10B depict exemplary data structures suitable for use in accordance with the present disclosure.

FIG. 11 is a data flow diagram illustrating exemplary data flows through the system architecture in accordance with the present disclosure.

DETAILED DESCRIPTION

This disclosure relates to a system architecture for automation and alarm systems, for which a hierarchy of processing capabilities is defined. Unlike conventional systems in which all of the processing is handled by a gateway entity, the exemplary system architecture moves processing tasks within the hierarchy in order to conserve resources, perform load balancing, and assign processing tasks to the devices that are best-suited to performing them.

Figure 1:
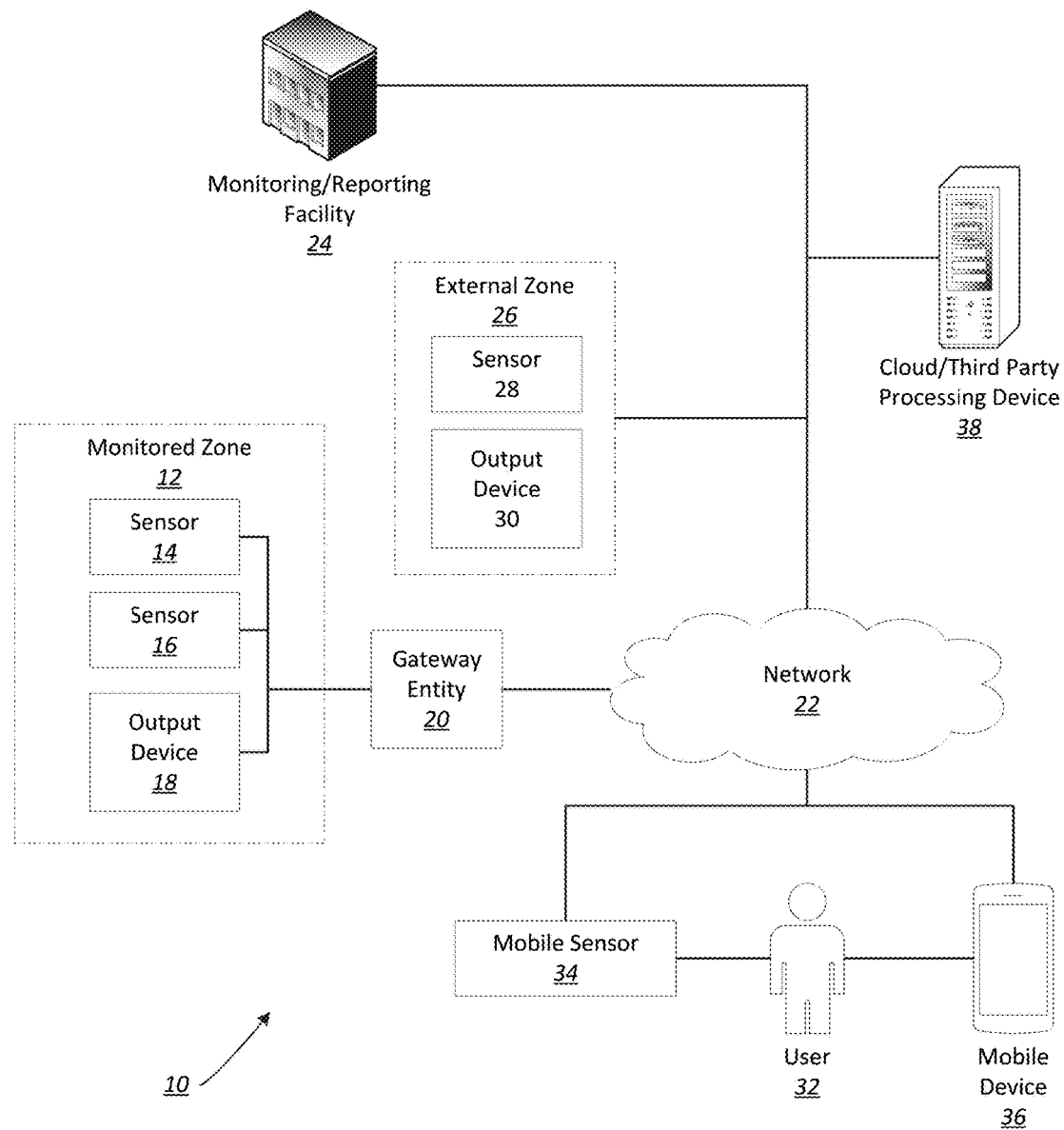
FIG. 1 is a block diagram illustrating an exemplary system architecture in accordance with the present disclosure.

FIG. 1 depicts an example of such a system architecture 10. The system architecture 10 of FIG. 1 is intended to be illustrative only, and one of ordinary skill in the art will recognize that the embodiments described below may be employed in a system architecture having more, fewer, and/or different components than the system architecture 10 of FIG. 1.

The system architecture 10 includes a monitored zone 12. The monitored zone 12 represents a logical grouping of monitored devices, and may or may not correspond to a physical location defined by physical boundaries (e.g., a room or a building). The monitored zone 12 represents, for example, some or all of a residential home, a business, a school, an airport, etc.

The exemplary monitored zone 12 includes a number of sensors (sensor 14 and sensor 16). Sensors include devices that measure or detect a physical property, such as temperature, pressure, the presence of light or smoke, or the position of a switch. A sensor translates the physical property into an electrical signal (e.g., using a transducer). Examples of sensors include environmental sensors (e.g., temperature sensors, pressure sensors, humidity sensors, light level sensors, etc.), status sensors (e.g., door and window switches, smoke detectors, movement detectors, valve status detectors, level indicators, flow level indicators, etc.), health sensors (e.g., heart rate sensors, blood flow sensors, sugar level sensors, body temperature sensors, etc.), location sensors (e.g., GPS transmitters or other location-based sensors placed on people, animals, property, etc.), as well as general- or multi-purpose sensors (e.g., microphones, cameras, manual pull switches, etc.).

The exemplary monitored zone 12 also includes an output device 18. Output devices include devices that provide an output signal, such as a sound, light, vibration, or an instruction to take an action, in response to a condition. The condition that causes the output device to provide the output signal may be, for example, the detection of a particular output from a sensor (e.g., the signal from the sensor falling below, or rising above, a predefined threshold value, or the detection of a predefined pattern in the sensor data), or a trigger message sent to the output device by another device.

Examples of output devices include notification devices such as speakers, strobe lights, a motor that induces vibration in a mobile device, etc. Some types of notification devices are configured to provide an output perceptible by a human (e.g., a notification device that provides a visual, aural, haptic, or other human-perceptible output), while other types are configured to provide an output perceptible by a machine (e.g., a silent alarm that transmits a notification of a security incident to a server at a security company, or a fire call box that sends an alert to a fire department).

Other examples of output devices include devices that control other devices or objects. Examples of such output devices include devices that open or close a door, turn a light on or off, adjust a heating, ventilating, or air conditioning (HVAC) device, etc.

A gateway entity 20 monitors and controls the sensors 14, 16 and the output device 18 of the monitored zone 12. Gateway entities include devices that manage or oversee the devices of a monitored zone 12, and which optionally communicate with devices outside of the monitored zone 12. A single gateway entity 20 may include one or more devices. The exemplary gateway entity 20 processes input data received from the sensors 14, 16 determines whether the sensor data indicates that an action should be taken, such as raising an alarm, and triggers the output device 18. Examples of gateway entities 20 include dedicated control panels and local computing devices (such as personal computers or local servers).

The gateway entity 20 can be deployed in the monitored zone 12, located near the monitored zone 12, or located remotely from, while remaining communicatively connected to, the monitored zone 12.

The embodiment of FIG. 1 includes a single monitored zone 12 controlled by a single gateway entity 20. In other embodiments, each of multiple monitored zones may be controlled by distinct gateway entities, or the monitored zones may be collectively monitored by a single gateway entity.

The sensors 14, 16 and the output device 18 are in communication with and operatively connected to the gateway entity 20. The connection may be a wireless connection (e.g., through Wi-Fi or a low-power short-range radio communication technology) or a hard-wired connection (e.g., through copper or fiber optic communications cabling, or throug a power line network).

The gateway entity 20 communicates with remote entities through a network 22. A network 22 is a collection of two or more nodes and links between the nodes that allow communicated information to be passed between the nodes. A network 22 may be wired or wireless. Examples of a network 22 include computer networks (such as the Internet, a local area network, or a metropolitan area network), and telephone networks (such as landline telephone exchanges and wireless telecommunications networks).

A monitoring/reporting facility 24 receives information from the gateway entity 20 through the network 22. A monitoring/reporting facility 24 is an entity that receives information about the status of sensors and/or monitored zones in the architecture 10. The monitoring/reporting facility 24 can take an action in response to the information, such as logging the information for future use, aggregating the information with other information to generate a report, acknowledging emergencies, and dispatching first responders to the monitored zone 12. Examples of monitoring/reporting facilities 24 include security companies, fire departments, doctors' offices and hospitals, and data storage centers.

An external zone 26 is also reachable via the network 22. The external zone 26, which is distinct from the monitored zone 12, includes a sensor 28 and an output device 30. In the example of FIG. 1, the external zone 26 is indirectly reachable from the gateway entity 20 through the network 22; however, in other embodiments the devices of the external zone 26 may be directly connected to the gateway entity 20 without the need to rely on an external network 22.

A user 32 also communicates with entities in the architecture 10 via the network 22. In the exemplary architecture shown in FIG. 1, the user 32 is a subscriber to the monitoring/reporting facility 24, which provides the user 32 with security oversight, emergency services, and reports about the status of the monitored zone 12. In other embodiments, the user 32 may not be a subscriber to the monitoring/reporting facility, and the user's gateway entity 20 may have access to a more limited subset of entities in the architecture 10.

The user 32 wears, carries, or otherwise interacts with a mobile sensor 34. A mobile sensor 34 is a sensor that is configured to be moved from one location to another, and which typically includes an integrated, rechargeable power supply and a wireless (or decouplable wired) communication device. Examples of mobile sensors 34 include health devices (e.g., heart rate monitors, pedometers, blood-sugar monitors, etc.), wearable devices (e.g., smart watches and pendants), and location-services devices (e.g., global positioning system devices).

The user 32 also carries a mobile device 36, such as a mobile phone or tablet. Using the mobile device 36, the user 32 can monitor the status of the monitored zone 12 and/or devices in the monitored zone 12 and obtain reports from the monitoring/reporting facility 24, among other actions. In some situations, the mobile device 36 may function as a gateway entity 20 by controlling or monitoring the mobile sensor 34 and/or the devices in the monitored zone 12.

The devices of the system architecture 10, including the gateway entity 20, the mobile device 36, sensors 14, 16, 28, and 34, output devices 18 and 30, and monitoring/reporting facility 24 each includes some amount of processing power.

A cloud- or third-party-processing device 38 augments the processing capabilities of the other devices in the architecture 10. A cloud- or third-party-processing device is a device that is accessible to the gateway entity 20 through the network 22 and that provides additional processing capabilities that can be called upon by the gateway entity 20 or another device in the system architecture 10 in order to perform processing tasks. The could- or third-party-processing device 38 may be, but is not necessarily, operated by the same entity that operates the monitoring/reporting facility 24.

Figure 2:
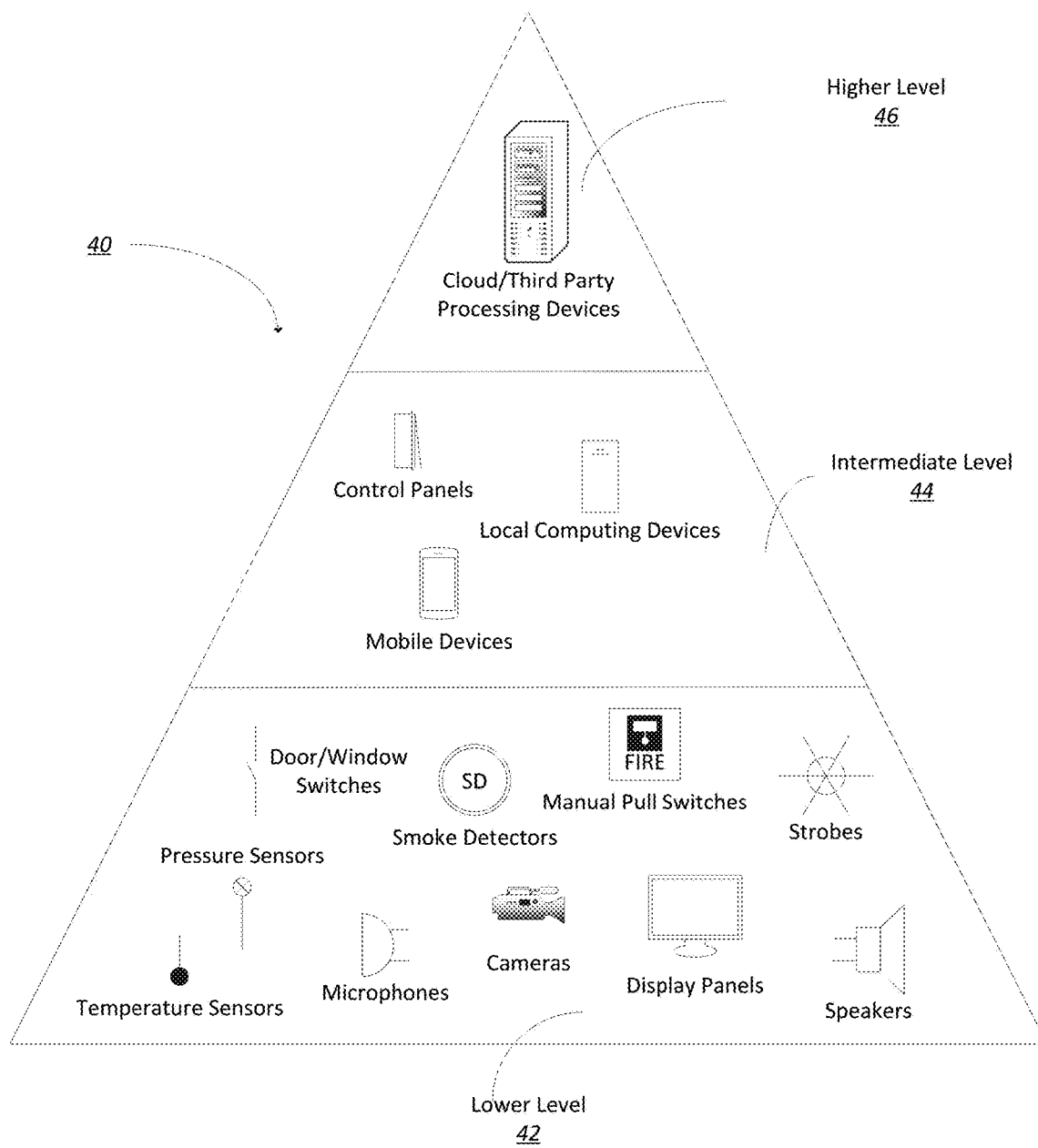
FIG. 2 depicts a hierarchy of processing devices in the system architecture.

According to exemplary embodiments, the devices of the system architecture 10 are organized into a hierarchy for purposes of processing sensor data, updating a system status, and triggering output devices (among other possibilities). FIG. 2 depicts an example of a hierarchy 40 of devices in the system architecture 10.

At a lower level 42 of the hierarchy 40, sensors and output devices are grouped together. Sensors and output devices typically possess limited processing capabilities and limited power, and hence are poorly-suited to complex processing tasks. Nonetheless, such devices can be relied upon to perform relatively simple processing tasks.

Moreover, these devices are typically deployed in a specific context and/or are called upon to monitor a very particular type of input. For example, a glass break sensor is a type of sensor that employs a microphone to record sound (e.g., in the vicinity of a window), which is then analyzed in order to detect a predetermined pattern or signal indicative of the sound of breaking glass. Even if the glass break sensor has only limited processing capabilities, those capabilities can be employed to detect relatively simple glass-break patterns, thus reducing the need to process all the sound data from the glass break sensor at the gateway entity 20.

If a device at the lower level 42 of the hierarchy 40 is unable to process some input data (or is not configured to do so), the device forwards the data to a device at the intermediate level 44 of the hierarchy 40. The intermediate level 44 includes gateway entities, such as control panels, local computing devices, and (in some situations) mobile devices such as cell phones and tablets. Such devices typically have improved processing and power capabilities as compared to devices at the lower level 42, which makes them well-suited to most processing tasks. Devices at the intermediate level 44 can perform more general-purpose analyses (as opposed to the special-purpose analyses performed at the lower level 42) and/or perform more complex analyses as compared to the lower level 42.

Devices at the intermediate level 44 may occasionally become overwhelmed in the presence of many data processing requests, or may encounter a processing task that is beyond its capabilities. In this case, processing tasks may be pushed up the hierarchy to the higher level 46. At the higher level 46, cloud- and third-party-processing devices perform complex tasks on behalf of the system.

It is noted that the connection between the lower level 42 (e.g., a sensor) and the intermediate level 44 (e.g., the gateway entity) will generally be well-defined and have a predictable number of "hops." This allows real-time or near-real-time processing of sensor data by the gateway entity, because the path between the sensor and gateway entity is predictable and quality of service can be managed. On the other hand, reliability can decrease when moving data between the intermediate level 44 and the higher level 46, because (e.g.) data may move over an external network for which quality of service cannot be guaranteed. Accordingly, some critical processes may preferably be handled at the lower level 42 or the intermediate level 44, with less-critical processes (e.g., non-time-sensitive data analytics, etc.) handled at the higher level 46.

Devices at different levels of the hierarchy 40 (and different devices at the same level of the hierarchy 40) may include different logic for processing the same data. For example, a smoke detector at the lower level 42 and a gateway entity at the intermediate level 44 may both have logic for analyzing smoke detector data to determine if there is a fire in the monitored zone. However, the gateway entity's logic may be more sophisticated than the smoke detector's logic. Thus, the smoke detector and the gateway entity could process the same data and come to different conclusions. This capability may be advantageously leveraged to provide a targeted and sophisticated analysis of the data. If a device at a lower level of the hierarchy processes data and determines that it nearly, but does not quite, indicate the presence of an alarm condition (e.g., the results of the processing do not exceed an alarm threshold but do approach the threshold within a predefined tolerance), then the lower level device may forward the data to another device in the architecture that has a more sophisticated or different processing capability.

Moreover, different devices at the same level of the hierarchy 40 may have different logic for processing data. Accordingly, different devices can be made to employ location-dependent or context-sensitive processing logic. For example, a smoke detector deployed in a kitchen may be provided with logic for eliminating false alarms due to cooking, while a smoke detector deployed in a front hallway may omit this logic.

The logic deployed on a device can be dependent on the hardware configuration of the device. For example, a sensor having new or improved hardware may deploy more complex or specialized processing logic as compared to an older or simpler sensor. In addition to providing location- or context-sensitive processing, this capability allows a device at one level in the hierarchy 40 to forward data to another, more specialized device (possible via a gateway entity) when presented with data that can be better handled by the specialized device.

In addition to improved processing, another advantage of the hierarchy 40 is that improved configuration settings can be developed at the upper levels of the hierarchy 40 (e.g., the intermediate level 44 and the higher level 46) and pushed down to lower levels of the hierarchy 40. For example, if a sensor at the lower level 42 determines that input data nearly, but does not quite, rise to the level of an alarm condition, the sensor may forward the input data to a device at the intermediate level 44 for further processing. If the device at the intermediate level 44 determines that the data should have triggered an alarm condition, the device at the intermediate level 44 may review the configuration of the device at the lower level 42 to determine if one or more configuration settings should be changed so that the lower level device can better analyze input data in the future. For example, the device at the intermediate level might lower the alarm threshold of the lower level device, or might alter the algorithm employed by the lower level device based on the algorithm used by the intermediate level device or another device in the architecture 10.

The structures of exemplary devices in the hierarchy, particularly an exemplary sensor 14 and an exemplary gateway entity 20, are now described with reference to FIGS. 3 and 4.

Figure 3:
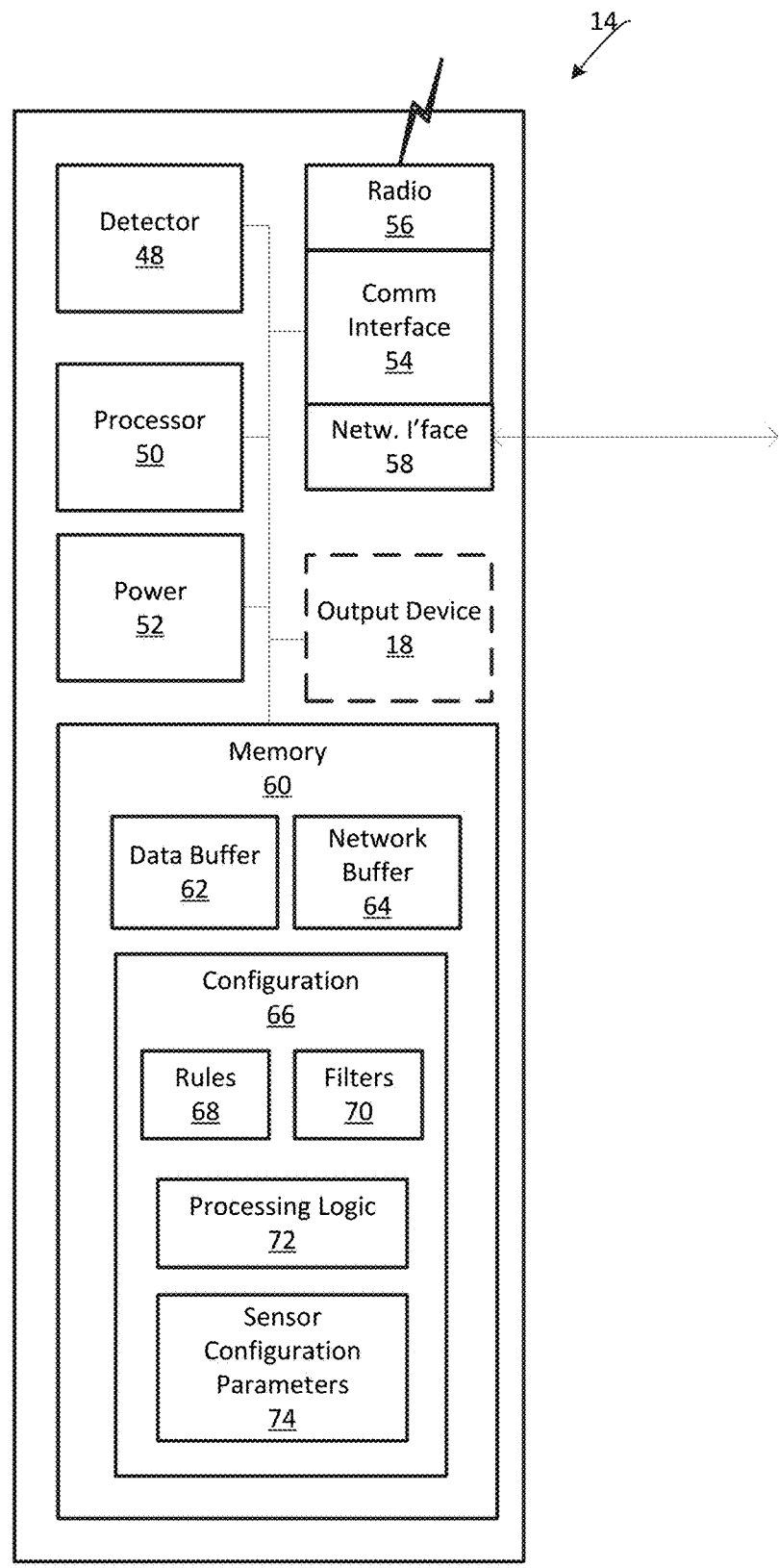
FIG. 3 is a block diagram illustrating an exemplary sensor device or output device in accordance with the present disclosure.
Figure 4:
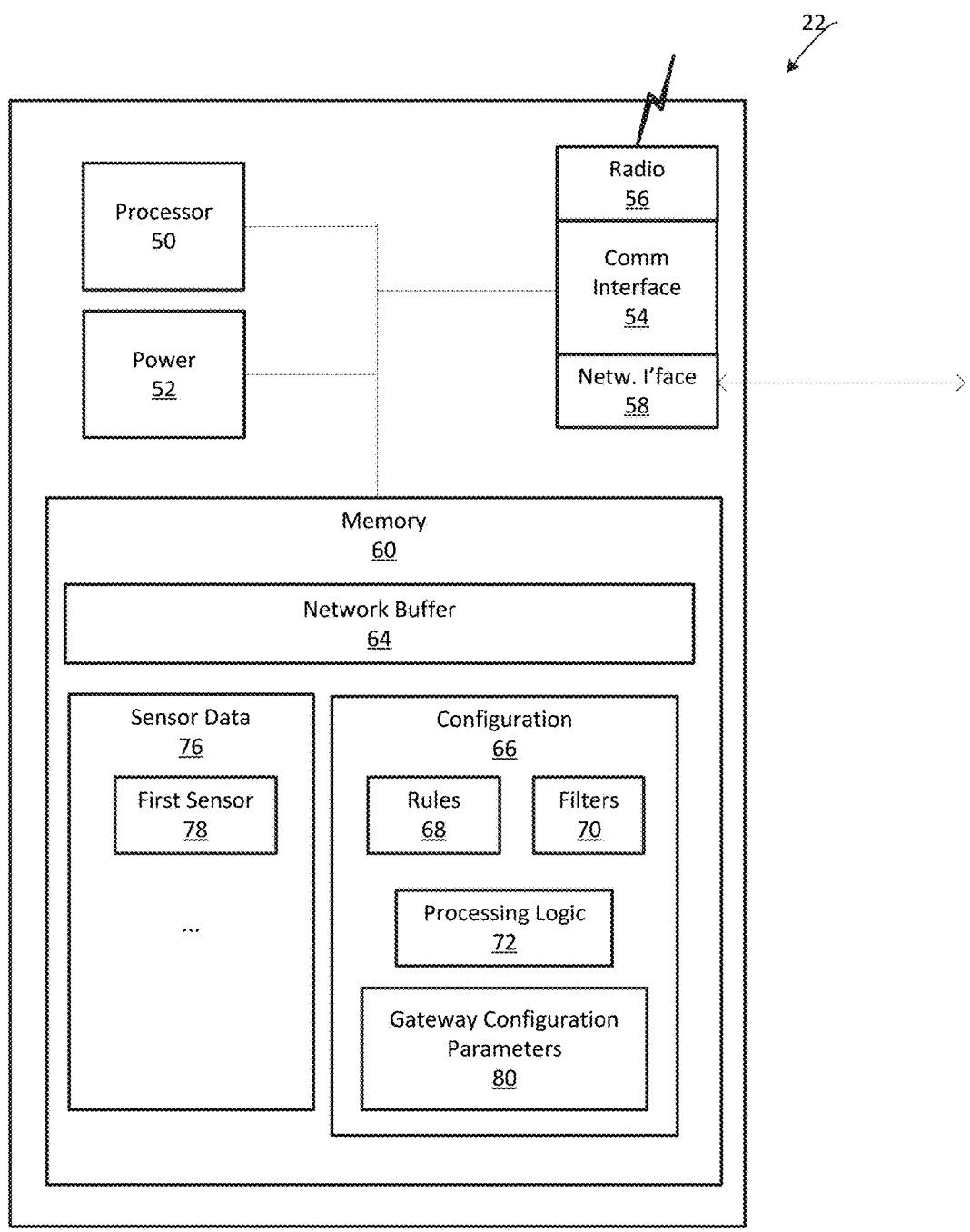
FIG. 4 is a block diagram illustrating an exemplary gateway entity in accordance with the present disclosure.

The sensor 14 depicted in FIG. 3 includes a detector 48. Detectors include devices that measure or identify a phenomenon and provide an output in response to the presence of the phenomenon, the absence of the phenomenon, or a change in the phenomenon. Examples of detectors include light or image sensors, microphones, thermometers/thermocouples, barometers, etc.

The output of the detector 48 is processed by a processor 50. Processors 50 include devices that execute instructions and/or perform mathematical, logical, control, or input/output operations. The processor 50 of the sensor 14 may be a specialized processor having limited processing capabilities and designed to run in low-power environments. For example, the processor 50 of the sensor 14 may implement the Reduced Instruction Set Computing (RISC) or Acorn RISC Machine (ARM) architecture. Examples of processors 50 include the Atom™ family of processors from Intel Corporation of Santa Clara, Calif., the A4 family of processors from Apple, Inc. of Cupertino, Calif., the Snapdragon™ family of processors from Qualcomm Technologies, Inc. of San Diego Calif., and the Cortex® family of processors from ARM Holdings, PLC of Cambridge, England. The processor 50 may also be a custom processor.

The sensor 14 includes a power interface 52 for supplying electrical power to the components of the sensor 14. The power interface 52 may be a connection to an external power source, such as a hard-wired connection to a house's or business' power supply. Alternatively or in addition, the power interface 52 may include an interface to a rechargeable or non-rechargeable battery, or a capacitor.

The exemplary sensor 14 engages in wireless and wired communication. Accordingly, the sensor 14 includes a communication interface 54 for managing communication between the sensor 14 and other entities in the architecture 10. The communication interface 54 accepts incoming transmissions of information from the other entities in the architecture 10, manages the transmission of information from the sensor 14 to the other entities, and provides quality control for data transmissions, among other communication-related functionality. The sensor 14 may connect to the network 22 through the communication interface 54.

The communication interface 48 wirelessly communicates with the other entities of the architecture 10 using a radio transmitter/receiver 56. The radio transmitter/receiver 56 modulates and demodulates electromagnetic signals carried wirelessly through a medium, such as the air or water, or through no medium (such as in space). In exemplary embodiments, the radio transmitter/receiver 56 of the sensor 14 may be a specialized radio transmitter/receiver that communicates over a relatively short range using relatively low power. Examples of lower-power radio transmitter/receivers 56 include devices communicating through short-wavelength ultra-high frequency (UHF) radio waves. Exemplary low-power radio transmitter receivers 56 may implement a communication protocol such as a ZigBee protocol from the ZigBee Alliance, the Bluetooth® Low Energy (BLE) protocol of the Bluetooth Special Interest Group, the Z-Wave protocol of the Z-Wave Alliance, the IPv6 over Low Power Wireless Personal Area Networks (6LoWPAN) protocol developed by the Internet Engineering Task Force (IETF), or a near field communications (NFC) protocol.

Alternatively or in addition, the sensor 14 could engage in wireless communication using other transmission/reception technologies, such as free-space optical, sonic, or electromagnetic induction.

The exemplary communication interface 54 also connects to a network interface 58 for interfacing with a wired communications network. The network interface 58 may be, for example, a network interface controller (NIC) for establishing a wired connection to a computer network such as the Internet, a fiber optic interface for connecting to a fiber optic network, a cable interface for connecting to a cable television network, a telephone jack for connecting to a telephone network, or a power-line interface for connecting to a power-line communications network.

Optionally, the sensor 14 may include an output device 18. For example, a smoke detector may include a sensor for detecting the presence of smoke, and one or more output devices (e.g., a siren and a strobe light) that are triggered based on the output of the sensor.

The sensor 14 includes a memory 60 for holding data, instructions, and other information for use by the other components of the sensor. In exemplary embodiments, the memory 60 of the sensor 14 may be a specialized memory that includes relatively limited storage and/or uses relatively low power. The memory 56 may be solid-state storage media such as flash memory and/or random access memory (RAM). Examples of memory 56 include Secure Digital™ (SD) memory from the SD Association. The memory 56 may also be a custom memory.

The memory 60 includes a data buffer 62 for temporarily storing data from the detector 48 until the data can be processed by the processor 50 or transmitted using the communication interface 54. The data buffer 62 may be, for example, a circular buffer. Data in the data buffer 62 may be processed on a first-in-first-out (FIFO) basis, a last-in-first-out (LIFO) basis, based on an importance of individual data units in the buffer, or based on a custom processing order. The data buffer 62 may be located at a fixed location in the memory 60.

In addition to the data buffer 62, the memory 60 includes a network buffer 64 for storing information transmitted or received via the communication interface 54. The processor 50 assembles data for transmission by the communication interface 54, and stores the data units in the network buffer 64. The communication interface 54 regularly retrieves pending data from the network buffer 64 and transmits it towards its destination. Upon receiving data from another device of the architecture 10, the communication interface 54 places the data in the network buffer 64. The processor 50 regularly retrieves pending data from the network buffer and processes the data according to instructions stored in the memory 60 or hard-coded into the processor 50. In order to distinguish between received data and data to be transmitted, the network buffer 64 may be subdivided into an "in" buffer and an "out" buffer. The network buffer 64 may be located at a fixed location in the memory 60.

The memory 60 furthermore stores a configuration 66 including rules 68, filters 70, processing logic 72, and configuration parameters 74. A configuration 66 is a description of hardware and/or software present on a device. Rules 68 describe one or more actions that occur in response to one or more conditions. Filters 70 are logic that is run on input and/or processed data in order to determine a next action to take with the data (such as processing the data locally, saving the data in a log, or forwarding the data to another device for processing). Processing logic 72 provides instructions and/or parameters that operate on input data (or, in some examples, no input data) to generate new output data, transform the input data into new data, or take an action with respect to the input data or some other data. Processing logic 72 may be applied to the data generated by the detector 48 in order to take an action, such as raising an alarm, changing a security or monitoring state of the architecture 10, operating an output device, etc. Configuration parameters 74 include values for settings that describe how the hardware and/or software of the configured device operates. The configuration 66, rules 68, filters 70, processing logic 72, and configuration parameters 74 are described in more detail in connection with FIGS. 7-10B, below.

The sensor 14 depicted in FIG. 3 primarily communicates with the gateway entity 20, which may be similar to the sensor 14 in terms of the types of components used. However, because there are fewer constraints on the gateway entity 20 in terms of size, location, and power consumption, the gateway entity 20 may have more and/or more powerful components than the sensor 14. Typically, the gateway entity 20 is a panel or computing device located in or near the monitored zone 12. In some situations, a user's mobile device 36 may function as a mobile gateway entity for some purposes (e.g., for processing data from the mobile sensor 34). FIG. 4 is a block diagram depicting the structure of an exemplary gateway entity 20.

The gateway entity 20 includes a processor 50. The processor 50 of the gateway entity 20 may be one of the aforementioned processors 50 described in conjunction with the sensor 14, above. In some embodiments, the processor 50 of the gateway entity 20 may be a Central Processing Unit (CPU) having one or more processing cores, one or more coprocessors, and/or on-chip cache.

In some embodiments, the processor 50 of the gateway entity 20 may be a specialized processor having improved processing capabilities as compared to the processor 50 of the sensor 14 and, as a result, may exhibit increased power consumption and/or heat generation as compared to the processor 50 of the sensor 14. For example, the processor 50 of the gateway entity 20 may implement the Complex Instruction Set Computing (CISC) architecture. Examples of processors 50 include the Celeron®, Pentium®, and Core™ families of processors from Intel Corporation of Santa Clara, Calif., and the Accelerated Processing Unit (APU) and Central Processing Unit (CPU) processors from Advanced Micro Devices (AMD), Inc. of Sunnyvale, Calif.

The gateway entity 20 further includes a power interface 52. The power interface 52 may connect directly to the power distribution system or power grid at the location in which the gateway entity 20 is deployed. The power interface 52 may include an interface for accepting alternating current (AC), direct current (DC), or both. The power interface 52 may include a converter for converting AC to DC, or vice versa. The power interface 52 may include a battery back-up in order to run the gateway entity 20 during power outages.

The gateway entity 20 includes a communication interface 54, radio 56, and network interface 58 similar to the respective components of the sensor 14. The gateway entity 20 may be expected to communicate with more devices than the sensor 14, and accordingly may be provided with more or more complex communication interfaces 54, radios 56, and network interfaces 58 than the sensor 14. The gateway entity 20 may be assigned to a particular monitored zone 12, and accordingly may maintain communication with each of the devices in the monitored zone 12 through the communication interface 54. The gateway entity 20 may also connect to the network 22 through the communication interface 54.

The gateway entity 20 includes a memory 60. The memory 60 of the gateway entity 20 may be similar to the memory 60 of the sensor 14, but typically exhibits greater storage space and/or improved performance (such as improved read/write times, improved seek times, and/or improved data redundancy or information backup capabilities). Examples of memory 60 suitable for use at the gateway entity 20 include random access memory (RAM), a hard disk drive (HDD), or a solid state drive (SSD), among other possibilities, or a combination of the same or different types of information storage devices.

The memory 60 provides a network buffer 64 similar to the network buffer 64 of the sensor 14. The memory 60 also includes a storage area for sensor data 76, which includes sensor data from each of the sensors in the monitored zone 12 overseen by the gateway entity 20 (e.g., first sensor data 78, second sensor data, etc.). The sensor data 76 may be stored on a separate partition of the memory 60 as compared to other elements stored in the memory 60.

The memory 60 of the gateway entity 20 also stores a configuration 66, rules 68, filters 70, processing logic 72, and gateway entity configuration parameters 80. These elements may be similar in structure to the respective elements of the sensor 14, although they may differ in content (e.g., different conditions and actions in the rules 68, different ways to filter the data in the filters 70, different instructions in the processing logic 72, different values in the configuration parameters 80, etc.)

As noted above, the gateway entity 20 forwards some data to a cloud- or third-party processing device 38 for further processing. The cloud- or third-party-processing device 38 has a structure similar to that of the gateway entity 20. For the sake of avoiding redundancy, the structure of the cloud- or third-party-processing device 38 is not shown separately. The cloud- or third-party processing device 38 may be deployed in a manner that allows qualitatively and quantitatively improved components, as compared to the gateway entity 20. For example, the memory of the cloud- or third-party-processing device 38 may include several hard disk drives (HDDs) or solid state drives (SDDs), among other storage possibilities. The memory of the cloud- or third-party-processing device 38 may be arranged into a redundant array of independent disks (RAID) configuration for reliability and improved performance.

Moreover, the processor the cloud- or third-party-processing device 38 may be qualitatively or quantitatively more powerful than the processor 50 of the gateway entity 20. For example, multiple processors 50 may be provided in the cloud- or third-party-processing device 38, which may include more processing cores than the processor 50 of the gateway entity 20. Furthermore, the processor(s) 50 of the cloud- or third-party-processing device 38 may be of a different, more powerful type than the processor 50 of the gateway entity 20. For example, the cloud- or third-party-processing device 38 may employ a more powerful central processing unit (CPU) than the gateway entity 20, or may employ more or better coprocessors than the CPU of the gateway entity 20, or may employ a graphical processing unit (GPU) that is more powerful than the CPU of the gateway entity 20.

Figure 5:
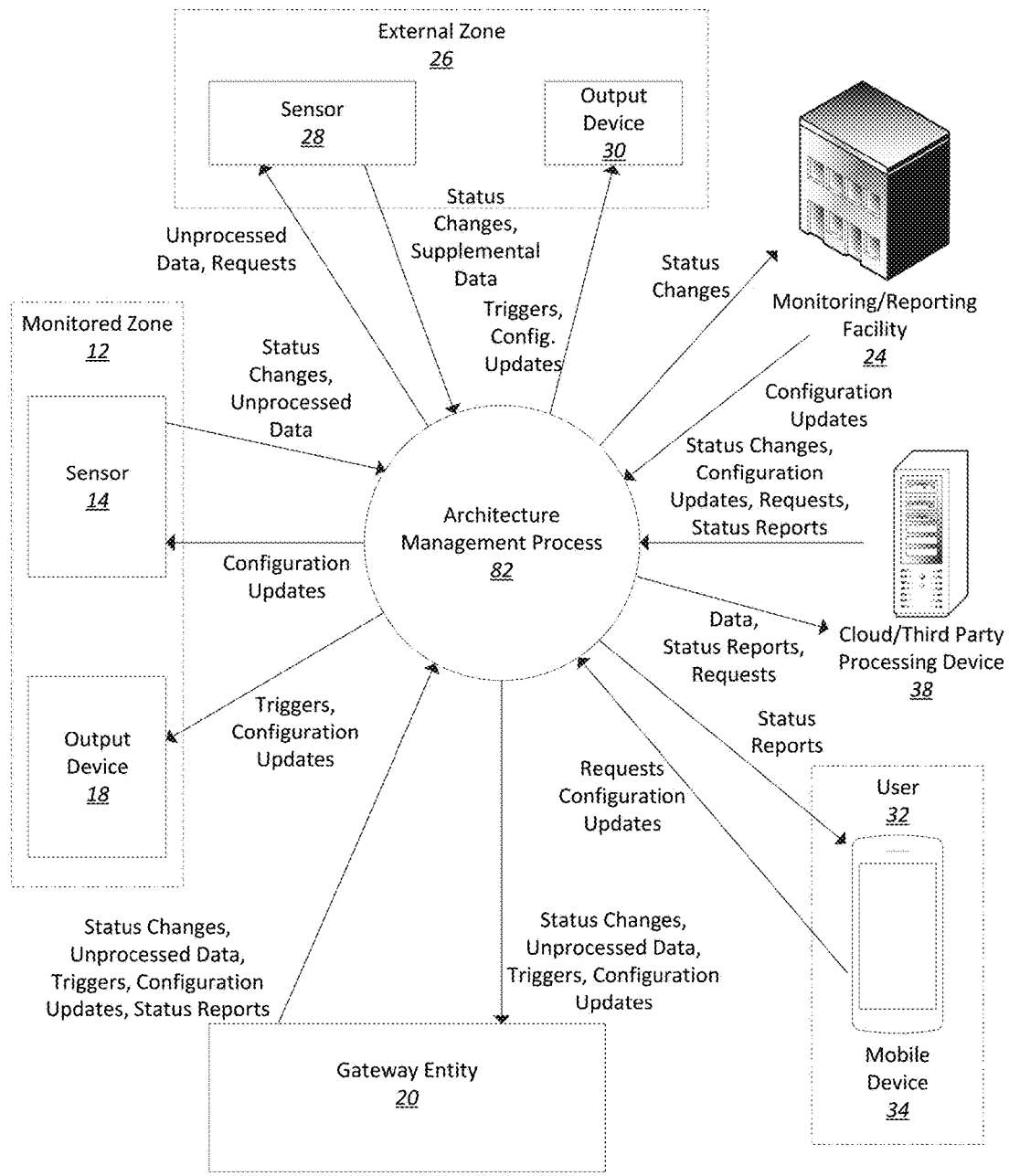
FIG. 5 is a system context diagram illustrating exemplary interactions between the devices of the system architecture from the perspective of the gateway entity in accordance with the present disclosure.

As shown in FIG. 5, the sensor 14, gateway entity 20, and cloud- or third-party-processing device 38 may interact with each other, and with other elements of the architecture 10, in order to process sensor data. FIG. 5 is a system context diagram showing how, in an exemplary embodiment, entities of the system architecture 10 interact with each other according to an architecture management process 82. The architecture management process 82 encompasses all of the steps or actions performed by the architecture 10 in order to process sensor data and manage the entities of the architecture 10. The architecture management process 82 includes actions described in more detail in the flow charts of FIGS. 11-15.

The sensor 14 of the monitored zone 12 (also referred to herein as the "primary" sensor) generates input data for the architecture management process 82 using the detector 48. Other devices, besides the sensor 14 of the monitored zone 12, may also serve as a primary sensor in some embodiments. For example, the user's mobile sensor 34 may also locally process data, send status changes or unprocessed data to the architecture management process 88, and receive configuration updates from the architecture management process 88.

The input data is stored in the sensor's data buffer 64 until it can be processed by the processor 50. The processor 50 retrieves the data from the data buffer 62 and makes an initial determination, based on a filter 70, to either process the data locally or forward the data to another device in the architecture 10 for processing.

If the data is processed locally and results in a change in status of the architecture 10 (e.g., an alarm condition is indicated), the sensor 14 generates, as an output to the architecture management process 82, a status change message. A status change message describes a change in the security or monitoring state of the architecture 10. A status change message may indicate that the state should be escalated (e.g., "change from a no-alarm condition to an alarm condition," or "increment the security level from 1 to 2," where level 2 indicates a higher state of vigilance than security level 1). Alternatively, a status change message may indicate that the state should be de-escalated (e.g., "cancel an alarm condition" or "decrement the security level from 2 to 1"). Still further, a status change message may set the state without reference to a previous state (e.g. "set the security level to 2").

In some embodiments, the status change message includes characteristics of the sensor 14, such as data from the sensor 14, information about the configuration of the sensor 14 (e.g., details about the firmware, software, hardware, etc.), a model identification of the sensor 14, the type of the sensor 14 (e.g., smoke detector, glass break sensor, etc.), or maintenance information (e.g., measurements of the resistance across various points in the circuitry of the sensor 14, measurements of a battery level or network connectivity of the sensor 14, power consumption of the sensor 14, etc.).

If the data is processed locally and does not result in a change in the status of the architecture 10, then no status change message is generated. Alternatively or in addition, a status change message reiterating the current state of the architecture 10 may be generated (e.g., at regular predefined intervals, or in response to a specific request from a sending device to process data at a receiving device).

If the processor 50 determines that the data cannot or should not be processed locally, then the sensor 14 generates, as an output to the architecture management process 82, a message including the unprocessed data for processing by another device in the architecture 10. Unprocessed data includes data (e.g., data generated by the sensor 14) that is designated by the architecture management process 82 for processing by a device different than the device on which the unprocessed data presently resides.

Unprocessed data may include data that is partially processed by the device on which the unprocessed data presently resides. For example, the sensor 14 may perform partial processing of the data, and forward some or all of the raw data, along with processing results, to the architecture management process 82 as unprocessed data. In other embodiments, the unprocessed data may be completely processed by the sensor 14, but may nonetheless be forwarded to another device for more consideration.

In some embodiments, the primary sensor (or the secondary sensor, described in more detail below), registers data with the detector 48 that is used for sound and speech recognition. For example, the detector 48 may receive speech data as an input and either locally process the speech data with the processor 50, or forward the speech data to the architecture management process 82 as unprocessed data. The speech data may be used for voice recognition and/or authentication to the architecture 10. For example, the speech data may be used to authenticate the user 32 when the user 32 enters the monitored zone 12. If the user fails to authenticate, the primary sensor may send a status update to trigger an alarm condition indicating an unauthorized user's presence in the monitored zone 12.

The sensor 14 receives, as output of the architecture management process 82, configuration updates. Configuration updates include messages describing a change in the configuration 66 of the device to which they are addressed. For example, configuration updates may update rules 68, filters 70, processing logic 72, and/or configuration parameters 74 of the affected device.

Configuration updates may be manually pushed to the sensor 14 by another entity in the architecture 10 (e.g., by the user 32 or the monitoring/reporting facility 24). For example, a user 32 might wish to change the detection thresholds on one or more sensors in order to make them more sensitive; alternatively, a programmer at the monitoring/reporting facility 24 might develop a more advanced detection algorithm, and might wish to deploy the detection algorithm on selected sensors.

Configuration updates can also be automatically pushed to the sensor 14 by another entity in the architecture 10 as new configurations are developed. For example, if the sensor 14 processes data and decides not to trigger an alarm, but the architecture management process 82 determines that an alarm should have been triggered, the architecture management process 82 may automatically send a configuration update to the sensor 14 to lower the sensor's detection thresholds. Alternatively, if the architecture management process 82 determines that an alarm should not have been triggered by the sensor 14 (but was triggered), the architecture management process 82 may automatically send a configuration update to the sensor 14 to raise the sensor's threshold. In another example, the architecture management process 82 may determine that a sensor's configuration is out-of-date and that a more up-to-date configuration exists on another nearby sensor. The architecture management process 82 may send a configuration update to the out-of-date sensor based on the configuration of the up-to-date sensor.

Notably, the sensor may be delivered with features that are activated dynamically based on the context in which the sensor 14 operates (e.g., based on which other devices are accessible to the sensor 14). For example, a sensor 14 that is not connected to other devices signals its state based on events detected by the sensor 14. A sensor 14 that is connected to a gateway entity 20 receives data from other sensors accessible to the gateway entity 20 and reacts to the data holistically. A sensor 14 connected to the cloud-or-third-party processing device 38 through the gateway entity 20 reacts based on data history analytics provided by the cloud-or-third-party processing device 38 and the state of the other sensors connected to the gateway entity 20.

The status changes and/or unprocessed data described above may result in a change in the security or monitoring state of the architecture 10, or may cause a predefined action to be carried out. Such a change may be communicated to an output device 18 through a trigger message provided as an output of the architecture management process 82. A trigger message is a message to an output device informing the output device of a change in the state of the architecture 10, or instructing the output device to take an action (or both). For example, a trigger message may inform the output device that the architecture 10 is in an alarm configuration, and internal rules of the output device may provide a particular type of notification in response. Alternatively or in addition, the trigger message may instruct the output device to perform a task (such as sounding an alarm or changing a temperature setting in the monitored zone 12).

Configuration updates may also be sent to the output device 18 as an output of the architecture management process 82. The configuration updates may change configuration settings of the output device 18.

The architecture management process 82 interacts with sensors and output devices distinct from the sensor 14 and output device 18 of the monitored zone 12. For example, if the unprocessed data forwarded by the sensor 14 of the monitored zone 12 is insufficient to trigger an alarm condition or a change in the state of the architecture 10, but the architecture management process 82 determines that further consideration of the data is required, the architecture management process 82 sends a request for supplemental data to a sensor 28 in the external zone 26. Such a sensor is referred to herein as a secondary sensor.

The secondary sensor receives, as an output of the architecture management process 82, requests for supplemental data. In response to the requests, the secondary sensor provides, as an input to the architecture management process 82, data from the secondary sensor's own detector 48 or from the secondary sensor's data buffer 62.

The secondary sensor that provides supplemental data to the architecture management process 82 need not necessarily be located in the external zone 26. The secondary sensor could be another sensor in the monitored zone 12, distinct from the primary sensor (e.g., the sensor 16). The secondary sensor may also be the mobile sensor 34 of the user 32.

The data from the secondary sensor is considered in conjunction with the unprocessed data provided by the primary sensor. When the combined data is evaluated holistically, a different determination can be made regarding whether to change the state of the architecture or trigger follow-up actions. For example, if the primary sensor data indicates that smoke may be present in a room (but perhaps does not rise to the threshold to generate an alarm), a nearby temperature sensor such as a thermometer in a thermostat may be consulted to determine if the temperature in the room is abnormal. If so, an alarm may be triggered.

The supplemental data from the secondary sensor may also be used to screen out false positives from the primary sensor. For example, if a glass break sensor detects a sound that seems to be a glass break, but a secondary sensor (e.g., a weather sensor) indicates that a thunderstorm is moving through the area, then supplemental data from the secondary sensor may be considered in determining whether to send an alarm or change the status or monitoring state of the architecture 10. In some embodiments, the gateway entity 20 may require corroboration of a positive result from a primary sensor, if the secondary sensor data indicates a risk that the result is a false positive.

Moreover, data from secondary sensors may be used to improve the detection capabilities of primary sensors. For example, if a primary glass break sensor records a sound that could be the sound of a window breaking, but the sound is distorted by extraneous noise, data from a secondary sensor (such as the microphone on a nearby video camera) could be used to filter out the extraneous noise and provide a clearer signal.

Still further, the additional information from the secondary sensor may be used to trigger additional actions. For example, if a smoke detector detects the presence of a fire in a house, and a motion sensor reports that a person is moving in the house, the resulting fire alarm may be escalated to a higher response level, and the presence of a person in the house may be reported to the responding fire department. In another example, the sensitivity or threshold for a particular outcome may be changed based on the additional information: in the above example, the presence of a person in the house as reported by the motion detector might cause the system to become less conservative in triggering a fire alarm under questionable or unclear circumstances.

The architecture management process 82 can leverage the processing capabilities of the secondary sensor. Because each device of the architecture 10 can be operated in a different configuration, each device may have customized logic or different thresholds that may be better suited to processing certain kinds of data. For example, a window-break sensor in a kitchen may have relatively simple detection logic programmed with a relatively high threshold for an alarm condition, in order to screen out false positives caused when a user 32 drops a glass or plate in the kitchen. A window-break sensor in a front hallway, on the other hand, may have specialized detection logic that has been recently customized with an advanced algorithm for detecting window breaks. If the sensor in the kitchen registers a noise that could represent a burglar breaking the kitchen window, but the sensor (and/or the gateway entity associated with the sensor) is unable to definitively classify the noise as such, then the architecture management process 82 may forward the kitchen sensor's unprocessed data to the front hallway sensor for specialized processing.

Accordingly, the architecture management process 82 provides, as an output to the secondary sensor 28, unprocessed data from other sensors. The secondary sensor 28 processes the data based on its own configuration 66, and determines whether to generate a status change as an input to the architecture management process 82.

Like the output device 18 of the monitored zone 12, data from the primary sensor and/or the secondary sensor is used to trigger output devices 30 in the external zone 26. These output devices 30 may also receive configuration updates in the same manner as the output device 18 of the monitored zone 12. Accordingly, the architecture management process 82 provides, as an output to the output device 30 of the external zone 26, triggers and configuration updates. For example, assume that the monitored zone 12 represents a first apartment in an apartment building, and the external zone 26 represents a second apartment, located near the first apartment in the building. If data from the sensor 14 in the monitored zone 12 indicates the presence of a fire or burglar in the first apartment, an output device 30 (e.g., siren) may be triggered in the second apartment.

The monitoring/reporting facility 24 monitors the state of the devices and zones of the architecture 10 for conditions that require further action (such as dispatching emergency services or contacting the user 32). Accordingly, the monitoring/reporting facility 24 is provided with, as an output of the architecture management process 82, status changes indicative of any change in the security or monitoring state of the architecture 10.

The monitoring/reporting facility 24 can serve (along with the cloud- or third-party processing device 38) as a point of contact with the architecture for purposes of pushing centrally-developed configuration changes to the devices of the architecture 10. Accordingly, the monitoring/reporting facility may provide configuration updates as an input to the architecture management process 82.

The cloud- or third-party processing device 38 provides additional processing capabilities for the architecture 10. In order to use these additional processing capabilities, the architecture management process 82 sends, as an output, unprocessed data to be processed at the cloud- or third-party processing device 38. If the cloud- or third-party processing device 38 determines that supplemental data from additional sensors is required, the cloud- or third-party processing device 38 transmits, as an input to the architecture management process 82, a request for supplemental data.

The cloud- or third-party processing device 38 processes the received data and makes a determination (e.g., to change the security or monitoring state of the architecture 10) based on the data. Accordingly, the cloud- or third-party processing device 38 may transmit, as an input to the architecture management process 82, a status change message describing how to change the state of the architecture 10. The cloud- or third-party processing device 38 may also transmit "null" status messages, indicating that the security or monitoring state of the architecture 10 does not need to be changed in response to the data.

In some embodiments, the cloud- or third-party processing device 38 determines that the configuration of one or more devices in the architecture 10 should be updated. Accordingly, the cloud- or third-party processing device transmits, as an input to the architecture management process 82, a configuration update to be applied at one or more devices accessible to the architecture management process 82.

The cloud- or third-party-processing device 38 also serves as a point of contact for a user 32 located outside of the communications range of the gateway 20, who wishes to receive reports regarding the status of devices in the monitored zone 12. For this purpose, the user 32 submits, via the user's mobile device 36, a request for a status report. The request is sent as an input to the architecture management process 82. The cloud- or third-party processing device 38 receives, as an output of the architecture management process 82, a request for the status of a device or zone.

In response, the cloud- or third-party processing device 38 generates requests for information to be forwarded to, for example, the gateway entity 20 associated with the device or zone, and provides these requests as an input to the architecture management process 82. The gateway 20, or another device, processes these requests and the cloud- or third-party processing device 38 receives, as an output of the architecture management process 82, status reports describing the status of the device or zone. The cloud- or third-party processing device 38 provides, as an input to the architecture management process 82, a status report derived from information in the configuration 66 of the relevant device, or of multiple devices in a zone, or from multiple zones. The report is forwarded to the user device 36 that submitted the original request.

Each of the devices of the architecture 10 interacts, directly or indirectly, with the gateway entity 20, which functions as a central hub or facilitator. Among other functions, the gateway entity 20: processes data from the sensors in the architecture 10; forwards unprocessed data to other devices that are better-suited to process the data; transmits status changes to the monitoring/reporting facility 24; requests supplemental data from secondary sensors; triggers output devices; receives configuration updates from the architecture management process 82; applies configuration updates on the gateway entity 20 and/or forwards configuration updates to devices communicatively coupled to the gateway entity 20; and processes status report requests from user mobile devices 38 and cloud- or third-party processing devices 38. In some embodiments, the gateway entity 20 may expose one or more Application Program Interfaces (APIs) to the other devices in the architecture 10 for these purposes.

The architecture management process 82 accepts the inputs from the various devices as shown in FIG. 5, and processes the inputs to generate outputs. As part of the architecture management process 82, a number of different data structures may be employed. Exemplary data structures suitable for use with embodiments of the invention are described below with reference to FIGS. 6-10B.

Figure 6:
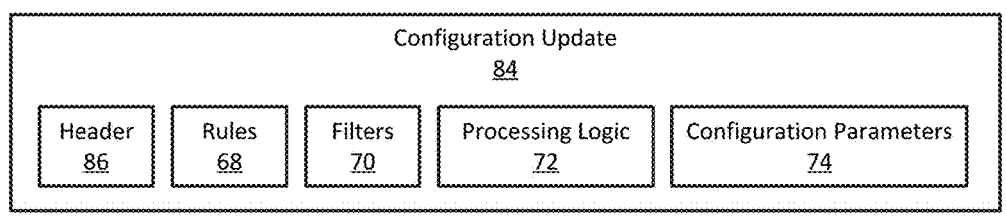

FIG. 6 shows an exemplary configuration update 84 that is used to update the configuration 60 of one or more devices in the architecture 10.

The configuration update 84 includes a header 86 that identifies, among other things, the destination for the configuration update 84. In some embodiments, the header 86 identifies specific devices on which the configuration update 84 should be deployed. Alternatively or in addition, the header 86 may identify a class of devices on which the configuration update 84 should be deployed (e.g., all smoke detectors).

In some embodiments, the header 86 also includes other information, such as a timestamp, a priority, and a checksum. The timestamp identifies the time at which the configuration update 84 was sent, which may be used to order configuration updates arriving in succession. In some cases, two configuration updates may conflict with each other, thus requiring that one configuration update override the other. The timestamp can be used to determine which configuration update was sent first (under the assumption that the latter configuration update was meant to override the former). If a first configuration update was transmitted before a second configuration update, then in some embodiments the later (second) configuration update is applied and overrides the first configuration update, regardless of the order in which the configuration updates are received at the device to be configured.

In some embodiments, a priority value is used to determine which configuration update should override other configuration updates. For example, if a first configuration update is received having a high priority and is applied at a configured device, the configured device may decide not to apply a subsequent conflicting configuration update having a lower priority.

A checksum in the header 86 is used to verify that the configuration update 84 was received correctly and not garbled in transmission. The checksum is applied at the transmitting device by calculating a checksum value over the payload of the configuration update 84, using any of a number of well-known checksum algorithms. The calculated checksum is added to the header 86. Upon receipt of the configuration update 84, a checksum value is calculated over the payload of the configuration update 84, and is compared to the checksum in the header 86. If the two checksums match, then the configuration update 84 is determined to have been received successfully. If the two checksums do not match, then the receiving device determines that an error occurred in transmission or reception, and requests that the configuration update 84 be re-transmitted.

The different elements in the configuration update 84 may be separated by a designated character (such as an End of Line character, or a comma, or any other suitable character). When the configuration update 84 is parsed by the receiving device, the receiving device may separate the different elements based on the designated characters, and may modify the corresponding elements of the configuration 60 of the configured device. Alternatively or in addition, the different elements in the configuration update 84 may be provided at predefined locations in the configuration update, or may have a predefined size, or may have a variable size that is reported in the header 86. Upon receiving the configuration update 84, the receiving device may separate the elements of the configuration update based on their position in the message and/or size.

Although the configuration update 84 is shown with updated rules 68, filters 70, processing logic 72, and configuration parameters 74, some of these items may be omitted from the configuration update 84. For example, if only the rules 68 (or a portion of a rule 68) are updated in a given configuration update 84, then the remaining items are omitted from the configuration update. The header 86 indicates which elements are updated in a given configuration update 84.

Moreover, the exemplary configuration update 84 is shown with sensor configuration parameters 74. However, the configuration update 84 may include configuration parameters specific to the device on which the configuration update 84 is to be deployed. For example, if the configuration update 84 is destined for a gateway entity 20, then the configuration update may include gateway configuration parameters 80.

Figure 7:
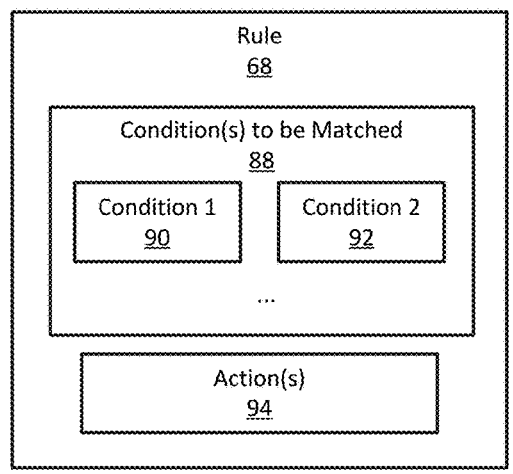

An example of a rule 68 suitable for use in a configuration 66 or configuration update 84 is shown in FIG. 7. The rule 68 attempts to match a set of conditions 88, as defined in the rule 68, to conditions in the architecture 10. When the set of conditions 88 is met, then one or more actions 94 are triggered.

A condition is a predefined set of states, statuses, or value for parameters that a device attempts to match against states, statuses, or parameters in the architecture 10. Examples of conditions 88 include matching a state of the architecture or a device to a predefined value or value range (e.g., the current security level is 1, 2, or 3; the smoke detector is in an "alarm" mode). Multiple states may be matched in a single condition (e.g., two smoke detectors separated from each other by more than a predefined distance are in an "alarm" mode; a glass break sensor is tripped and a motion detector detects motion in the room). One or more of the conditions 88 may be time-based (e.g., the current time is 10:30 AM; the current time is between 10:00 PM and 6:00 AM).

The set of conditions 88 may be an empty set (i.e., no conditions), in which case the action 94 is carried out immediately upon receiving the rule 68, and subsequently discarded. Alternatively, custom logic may be applied to define how to carry out rules having no associated conditions 88.

Some or all of the conditions 88 may be specified using logical operators such as AND, OR, XOR, NOT, etc. For example, the rule 68 may specify that the first condition 90 and the second condition 92 must both be met for the action 94 to be triggered. Alternatively, the rule 68 might specify that either the first condition 90 or the second condition 92 must be met to trigger the action 94.

When the set of conditions 88 is matched to a current status of the architecture 10 or device(s), the action 94 specified in the rule is carried out. An action 94 is a set of one or more instructions or tasks to be carried out by the device on which the rule 68 is triggered. Examples of actions 94 include performing a task locally (e.g., trigger an integrated notification device; process additional data) and forwarding instructions to other devices (e.g., send a status update to the gateway 20, escalating the security level of the architecture 10; trigger the dishwasher to start running).

A rule 68 can specify a number of times that the rule is to be carried out. This may be done, for example, by specifying a maximum number of applications as one of the conditions 88, and tracking the number of times that the rule 68 has caused the action 94 to be triggered. Upon reaching the maximum number of applications, the rule 68 is discarded.

In addition to rules 68, the configuration update 84 specifies filters 80. Two examples of filters 80 are shown in FIGS. 8A and 8B. FIG. 8A depicts an exemplary processing determination filter 90, which is a pre-processing filter applied to data present on a local device to determine if the data should initially be processed locally, or forwarded to a different location in the architecture 10 for processing. FIG. 8B depicts an exemplary escalation filter 102, which is a post-processing filter applied after data is processed locally in order to determine if the data should be further processed by other devices in the architecture 10.

As shown in FIG. 8A, the processing determination filter 90 includes evaluation logic 92. The evaluation logic 92 accepts input data and/or contextual information about the data (e.g., the type of sensor(s) that generated the data, the location at which the sensor(s) were deployed, any initial processing that has been done on the data, etc.) and evaluates the data to determine whether the data should be processed locally.

The exemplary evaluation logic 92 evaluates the input data and/or contextual information against one or more thresholds 94 to determine whether the data should be processed locally. A threshold 94 represents a magnitude or intensity that must be met or exceeded in order for a given result to occur. In the example of the evaluation logic, the thresholds 94 represent dividing lines which cause certain predefined actions to be performed depending on whether a measured parameter falls on one side or the other of the threshold 94.

In the exemplary processing determination filter 90, the data is compared against a complexity threshold 96. A complexity threshold 96 represents a maximum complexity that the local device is capable of tolerating in data while still being capable of efficiently processing the data. In the exemplary embodiment, the evaluation logic 92 analyzes the data and the contextual information about the data, and assigns a complexity score to the data. The complexity score may be calculated by considering the type of sensor the data originated from, the amount of the data, whether the data values are stable or variable, whether the data is clear or noisy, whether the data includes any immediately recognizable patterns, etc.

If the complexity score meets or exceeds the complexity threshold 96, then the evaluation logic 92 determines that the data is too complex for processing at the local device. If the complexity score is below the complexity threshold 96, then the evaluation logic 92 determines that the local device is capable of processing the data.

The evaluation logic 92 also uses a load threshold 98 to perform load balancing. Load balancing refers to the distribution of tasks, jobs, or other work among multiple computing resources. In the exemplary embodiment, the evaluation logic 92 compares a load on the local processor(s) (e.g., a percentage of local processing resources currently being utilized, a number and/or complexity of jobs currently being processed, etc.) to the load threshold 98. If the current load meets or exceeds the load threshold 98 then the evaluation logic 92 may determine that the processing task under consideration should be processed elsewhere. If the current load is below the load threshold 98, then the evaluation logic 92 may determine that the processing task should be performed locally.

The evaluation logic 92 can be programmed with a list of accessible devices having computing resources available for use, and an indication of the types of processing tasks the devices specialize in. If the evaluation logic 92 determines that a processing task should be forwarded to another device in the architecture, the evaluation logic 92 may consult the list to select an appropriate destination device.

The devices in the list can be associated with a priority indicating the order in which processing tasks should be sent to the listed devices. For example, among devices specializing in a particular type of data (e.g., smoke detector data), the devices can be ranked in order of priority. The next processing task received for that particular type of data may be sent to the highest-priority device in the list. A query may be sent to the highest priority device to determine whether the highest priority device is capable of performing a new processing task. If the highest priority device responds by acknowledging its willingness to perform the task, the data may be sent to the highest priority device for processing. If the highest priority device responds by rejecting the processing request, the local device may proceed to the next-highest priority device in the list. This process may be repeated until an appropriate device is selected.

Devices in the list may exchange messages (e.g., through the gateway entity 20) in order to change their priority ranking on other devices. For example, if a given device is assigned a large number of processing tasks and its processing load approaches to within a predefined tolerance of the device's load threshold 98, the overloaded device may send a message to the gateway entity 20 requesting that the overloaded device's priority be lowered in the evaluation logic 92 of other devices in the architecture 10. Accordingly, other devices will be less likely to send processing tasks to the overloaded device. When the overloaded device's processing load drops to a predefined level (or after a predetermined amount of time), the device's priority may be raised.

A local device may also change a remote device's priority in the local device's evaluation logic 92 as the local device assigns tasks to the remote device. For example, if a gateway entity 20 sends a processing job to a first sensor 14, the gateway entity 20 may lower the priority of the first sensor so that the next task is sent to a second sensor 16. Thus, the gateway entity 20 can distribute tasks more uniformly.

The list may also include a default device located at the next-highest level of the hierarchy 40 (as compared to the local device that is currently preparing to re-assign the processing task) to which tasks may be forwarded if no other device is identified. For example, the default device at the intermediate level 44 of the hierarchy 40 can be the gateway 20, and the default device at the higher level 46 of the hierarchy 40 can be the cloud- or third-party processing device 38.

In addition to determining whether the data should be processed locally or remotely, the processing determination filter 90 also applies a reporting ruleset 98 to any received data to determine whether the data should be logged in a local memory, forwarded to other specified devices in the architecture 10, or processed and discarded. The reporting ruleset 98 matches conditions 88 such as a type of data, an interval of time at which data should be recorded, recognized patterns in the data, etc. against the input data (potentially after the data is processed by the evaluation logic 92). If the conditions 88 match the data, the reporting ruleset 98 applies an action 94 such as storing the data in a local memory (e.g., the memory 60 of the sensor 14, or the memory 60 of the gateway entity 20) or forwarding the data to a device specified in the action 94.

If the processing determination filter 90 determines that the data should be processed locally, the data is processed according to the processing logic 72 of the local device. After processing by the processing logic 72, the device applies an escalation filter 102, as shown in FIG. 10B, to determine if the data should also be escalated to another device for further processing.

The escalation filter 102 is applied if the processing logic 72 decides to take any action, decides to take a specific action (such as raising an alarm), decides to take no action, or any combination of possibilities.

The escalation filter 102 has evaluation logic 104 that determines whether processed data should be escalated by being further processed at another device. The evaluation logic 104 decides to escalate the data for further processing if the processing logic 72 is unable to process the data. For example, if the data is voice data that includes commands, and the processing logic 72 is unable to identify the commands in the voice data with a high degree of confidence, the evaluation logic 104 may escalate the data for further processing at a higher level of the hierarchy 40.

The evaluation logic 104 consults a threshold 106, such as an escalation threshold 108, in order to determine if the data should be escalated. In one exemplary embodiment, the escalation threshold 108 applies when the processing logic 72 determines not to take an action, but was within a predefined tolerance of taking the action (suggesting that the determination may be a false negative). Alternatively or in addition, the escalation threshold 108 applies when the processing logic 66 determines to take an action, but was within a predefined tolerance of not taking the action (suggesting that the determination result may be a false positive). The escalation threshold 108 is a value or range of values defining these tolerances.

For example, the processing logic 72 may trigger an alarm at an output device 18 if the value v of sensor data from a sensor rises above a predefined alarm threshold a. The escalation threshold may be set to a value e. If the sensor data value v rises above a, the processing logic 72 will trigger the alarm. If the sensor data value v is at or below the value a-e, then the processing logic 72 will determine that no alarm should be triggered, and the escalation filter 102 will not escalate the data for further processing by another device. If the sensor data is in a range {a-e<v<a}, then the processing logic 72 will not trigger the alarm, but the escalation filter 102 will forward the data to another device for further processing.

The escalation threshold 108 is modified by security level modifiers 110. The security level modifiers 110 represent a value or values used to raise or lower the escalation threshold 108, depending on the current security level or state of the architecture 10 (or one or more zones 12 in the architecture 10). As the security level or state changes, the security level modifiers 110 modifies the escalation threshold 108 to make the evaluation logic 104 more or less prone to escalating the data. For example, if the security level is elevated, the evaluation logic 104 may be made more likely to escalate the data for further processing. If the security level is relatively low, the evaluation logic 104 may be made less likely to escalate the data.

In a further embodiment, the evaluation logic 104 applies pattern recognition and escalates the data if a particular pattern is identified in the data, regardless of whether the processing logic 72 decided to take an action in response to the data.

The evaluation logic 104 of the escalation filter 102 selects a device to which the data should be forwarded in a manner similar to the way that the evaluation logic 92 of the processing determination filter 90 selects a device to which the data should be forwarded. The criteria for the evaluation logic 104 may also be different than the criteria for the evaluation logic 92.

Either or both of the processing determination filter 90 and the escalation filter 102 may decide to escalate processing of the data to another device based on whether the data requires a critical decision (e.g., a real-time or near-real-time decision). In order to determine whether to process data requiring a critical decision locally or remotely, the respective filters may estimate a processing time for each prospective processing device, which includes the time to process the data and the time to transmit the data to and from the processing device. The filters may also calculate a connection reliability (e.g., based on connection speed, connection uptime, and momentary available bandwidth). If the filters determine that a critical decision can be made by one device but not another, then the filters may select the appropriate device to process the data. If either device is capable of processing critical data, then the escalation decision may be made based on other factors, as described above.

The post-processing logic 102 is applied following processing of the data by the processing logic 72. An example of processing logic 72 is shown in FIG. 9.

The processing logic 72 includes evaluation logic 112. The evaluation logic 112 accepts input data, such as data from a detector 48 of a sensor 14, or aggregated data from multiple sensors, and processes the data to transform the data into new output data, modify existing data, or perform an action. The processed data is compared to a threshold 116, such as a triggering threshold 118. The triggering threshold 118 defines a value that, if the value of the input data rises above or falls below, causes an action to be performed. The evaluation logic 112 also applies pattern matching to the data to determine whether to take the action.

The input data and/or processed data is also compared to a triggering ruleset 114. The triggering ruleset 114 defines rules 68 in which the conditions 88 relate to the data being processed. For example, one rule of the triggering ruleset 114 may indicate that, if the data includes a pattern indicative of a person returning home, an output device 18 such as a light should be turned on. Another rule of the triggering ruleset 114 may relate to sending a status update or notification to another device, such as the user's mobile device 36, the cloud- or third-party processing device 38, or the monitoring/reporting facility 24.

The rules of the triggering ruleset 114 can be location-dependent (e.g., by including location information as one of the conditions 88). For example, if the rule is a rule that is triggered by a fire alarm and triggers an action 94 of turning on a sprinkler system, one of the conditions of the rule may be that the sprinklers should not be triggered until absolutely necessary if the output device (sprinkler) is in a computer lab or server room.

Figure 10A:
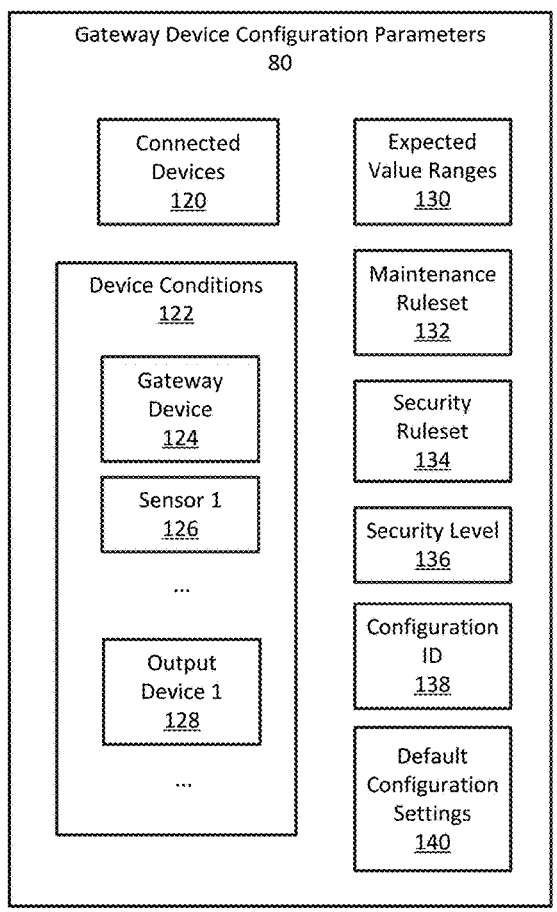
Figure 10B:
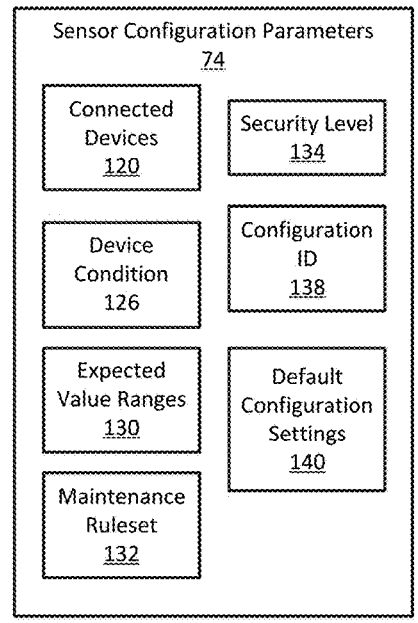

Turning now to the configuration parameters 74, 80, exemplary parameters for gateway entity 20 and the sensor 14 are depicted in FIGS. 10A and 10B, respectively.

FIG. 10A depicts configuration parameters 80 for deployment on a gateway entity 20. The configuration parameters 80 specifies a list of connected devices 120. The list of connected devices 120 includes an identifier for each device that is (or should be) communicatively coupled to the gateway entity 20, as well an indication of the type of each device. The identifier may be an address of the device (e.g., an IPv6 address). The list of connected devices 120 includes devices that the gateway entity 20 is responsible for overseeing (e.g., the sensors 14, 16 and output device 18 of the monitored zone 12), as well as other devices with which the gateway entity 20 is capable of communicating (e.g., the cloud- or third-party processing device 38 and the monitoring/reporting facility 24).

The configuration parameters 80 includes a list of device conditions 122 representing the status of the devices in the list of connected devices 120. The status of the devices reflects any, or a combination, of communication status (e.g., communicatively connected to the gateway entity 20 and/or the network 22), device maintenance status (e.g., a battery level of the device, whether the device is scheduled for maintenance, whether the device is reporting abnormal data, etc.), a configuration status of each device (e.g., a list of the configuration ID(s) 138 for each device) and other statuses.

The list of device conditions 122 includes the condition of the gateway entity 124 itself, as well as a condition 126 for each sensor and a condition 128 for each output device overseen by the gateway entity 20. The status conditions may be reported by each device in response to a query from the gateway entity 20, at regular intervals, or may be updated by the gateway entity 20 (e.g., in response to not receiving a reply or an expected update from the device).

The configuration parameters 80 include expected value ranges 130 for the configured device. The expected value ranges represent a range of values for one or more operational parameters or characteristics of the configured device which indicate normal operation of the device. If the device generates an operational parameter or exhibits a characteristic outside of the expected value ranges 130, this may indicate a malfunction of the configured device requiring maintenance. The configuration parameters may, accordingly, include a maintenance ruleset with a set of rules 68 to be applied when one or more operational parameters or characteristics falls outside of the expected value ranges 130. The maintenance ruleset 132 may specify actions, such as performing diagnostic tests, reporting a malfunction to the monitoring/reporting facility 24 or the user 32, or performing maintenance operations (such as rebooting the device, using alternative hardware or software if available, or restoring the device to a last-known-good configuration).

The configuration parameters 80 also include a security ruleset 134 including rules 68 that specify actions to be taken in the event that an alarm condition is raised or the security level 136 of the architecture 10 changes.

The security level 136 represents a level of vigilance or a monitoring state of the architecture 10 or a portion of the architecture 10. The security level 136 may be specified as a quantitative value (e.g., level 1, level 2, etc.), or may be specified as a set of "modes." Examples of "modes" are shown in Table 1 below:

TABLE 1

| Mode Name | Mode Description |
| --- | --- |
| Secure | Monitored zone(s) is/are secured. All normal sensors are enabled and working properly. No occupants are present in the monitored zone(s), except possibly pets. |
| Watchful | Monitored zone(s) is/are fairly to quite secure. Occupants may be at present. |
| At Risk | Transitional State indicating that monitored zone(s) is/are not secure. May be attempting to authenticate an occupant. |
| Intruders | Something is wrong in monitored zone(s). Could indicate the presence of intruders or vandalism. |
| Emergency | Life threatening condition detected, such as a fire or gas leak. |
| Trouble | A significant issue has been detected, such as a flood, power failure, or inoperable appliance. |
| Nuisance | A minor issue has been detected. |

The security ruleset 134 includes default actions to be taken whenever the security level 136 is in a particular status. For example, if the security level 136 is set to the "emergency" mode, the security ruleset 134 may cause requests for data to be repeatedly sent to a relevant sensor.

The configuration parameters 80 deployed on the device may be customized to the device, to the location in which the device is deployed, and/or based on other considerations. In order to identify which configuration is present on which device (which may be used, for example, to determine whether a particular device is well-suited to processing certain kinds of data), the configuration parameters 80 may be associated with one or more configuration ID(s) 138. The configuration ID(s) 138 may be, for example, a checksum, and identification string, or a series of flags uniquely identifying a part or all of a set of configuration parameters 80.

The configuration parameters 80 also include default configuration settings 140. The default configuration settings 140 are settings for some or all of the configuration parameters 80 that are applied in certain conditions, such as when the device is started or restarted, or when a configuration parameter 80 is corrupted or otherwise rendered unusable. As configuration updates 84 are received, the default configuration settings 140 may optionally be updated with the new configuration settings contained in the update 84.

As shown in FIG. 10B, the configuration parameters 74 for deployment on a sensor 14 are similar to the gateway entity configuration parameters 80. Because the sensor 14 is not typically responsible for overseeing other devices in the architecture 10, some of the elements from the gateway entity configuration parameters 80 may be eliminated in the sensor configuration parameters 74.

The rules 68, filters 70, processing logic 72, and configuration parameters 74, 80 are applied by devices in the architecture to process input data from one or more sensors 14. Methods performed by the devices in the architecture 10 will next be described with reference to FIGS. 11-15.

FIG. 11 is a data flow diagram showing a flow of data through the architecture 10. For clarity of discussion, FIG. 11 focuses primarily on the above-described data processing and configuration updating aspects of the architecture management process 82. Other processes, such as the reporting mechanisms discussed above, are omitted from the data flow diagram.

Initially, the primary sensor 14 generates sensor data and performs a filtration process 142 to determine whether to process the sensor data locally (at the primary sensor 14) or forward the sensor data to the gateway entity 20. The filtration process 142 is depicted in detail in FIG. 12.

If the primary sensor 14 determines that the sensor data should be processed locally, a local processing step 144 processes the data. The local processing step 144 is depicted in detail in FIG. 13.

At the local processing step 144, there are several possible outcomes. One possible outcome is that the processed data does not trigger any actions. If the processed data does not trigger an action and an escalation filter 102 does not indicate that the data should be escalated for further processing, no action is taken and the data flow begins again using new data generated by the primary sensor 14. If the escalation filter 102 does indicate that the data should be escalated for further processing, then the sensor data is forwarded to the gateway entity 20.

Another possible outcome is that the local processing 144 does trigger a follow-up action, such as a status change or an action performed by an output device. In these situations, the local processing step 144 generates a status update and forwards it to the gateway entity 20, and/or generates a trigger and forwards it to a primary output device 18.

If the local processing step 144 causes a status update to be sent to the gateway entity 20, the gateway entity 20 processes the change in status (e.g., by changing the security level 136 and applying any applicable rules from the security ruleset 134). This may involve triggering one or more output devices, such as the primary output device 18 and/or the secondary output device 30.

If the filtration step 142 or the local processing step 144 performed by the primary sensor 14 cause sensor data to be sent to the gateway entity 20 for further processing, the gateway entity 20 applies a filtration process 142 to determine whether the gateway entity 20 should process the sensor data locally (or through a secondary sensor 28 that is reachable by the gateway entity 20). If so, the gateway entity performs a local processing step 144 on the sensor data.

At the local processing step 144 performed by the gateway entity 20, there are several possible outcomes. One possible outcome is that the processed data does not trigger any actions. If the processed data does not trigger an action and an escalation filter 102 does not indicate that the data should be escalated for further processing, no action is taken and the data flow may begin again using new data generated by the primary sensor 14. If the escalation filter 102 does indicate that the data should be escalated for further processing, then the sensor data is forwarded to the cloud- or third-party-processing device 38.

Another possible outcome is that the local processing 144 does trigger a follow-up action, such as a status change or an action performed by an output device. In these situations, the local processing step 144 generates a status update and forwards it to the reporting/monitoring facility 24, changes the security level 136 at the gateway entity 20 (if necessary), and triggers any applicable rules from the security ruleset 134. For example, the local processing step generates a trigger and forward it to a primary output device 18. If the security ruleset 134 indicates that a secondary output device 30 should be triggered, then the local processing step 144 forwards a trigger to the secondary output device 30 as well.

Yet another possible outcome is that the gateway entity 20 determines, either initially or as the data is processed, that the data should be forwarded to a secondary sensor 28 that is well-suited to processing the sensor data. For example, the secondary sensor 28 may be deployed with a specialized configuration 66 that is particularly well suited to processing the type of data received from the sensor 14. Accordingly, the local processing step 144 of the gateway entity 20 may forward the sensor data to the secondary sensor 28 for processing, and may receive a status update in response.

Alternatively or in addition, the local processing step 144 may determine that supplemental data is needed in order to process the sensor data. The local processing step 144 therefore sends a request to the secondary sensor 28, and receive sensor data from the secondary sensor 28 in response.

The filtration step 142 and/or the local processing step 144 performed by the gateway entity 20 may cause sensor data to be forwarded to the cloud- or third-party processor 38 for further processing. The cloud- or third-party processor 38 applies a local filtration step 142 (not shown) and a processing step 144 to the data. Similar to the local processing step 144 performed by the gateway entity 20, the cloud- or third-party processor 38 may determine that additional data is needed from a secondary sensor 28.

If the local processing step 144 performed by the cloud- or third-party processor 38 generates a status update and/or any triggers for output devices 18, 30, the status update and trigger(s) are sent to the gateway entity 20 to be acted upon accordingly.

The gateway entity 20 and/or the cloud- or third-party processor 38 may generate, as a part of their respective local processing steps 144, a configuration update that changes the way that one of the sensors 14, 28 or the gateway entity 20 processes future sensor data. Configuration updates may also be generated by other entities, such as the monitoring/reporting facility 24. The configuration updates may be pushed to the gateway entity 20 for distribution to the affected devices. Alternatively or in addition, if the entity generating the configuration update is able to communicate directly with a device, the entity may push the configuration update directly to the device. For example, in FIG. 11 the local processing step 144 of the cloud- or third-party processor 38 and the monitoring/reporting facility 24 are both shown pushing a configuration update to the secondary sensor 28.

Furthermore, although not depicted in FIG. 11, the user 32 may generate a configuration update 84 to modify the settings on one or more of the user's devices. The configuration update 84 may be forwarded to the cloud- or third-party processing device 38 (e.g., using the user's mobile device 36). The cloud- or third-party processing device 38 may validate the configuration update 84 to verify that the user 32 is authorized to make the changes in the configuration update 84. If the cloud- or third-party processing device 38 determines that the user 32 is authorized, the cloud- or third-party processing device 38 may forward the configuration update 84 to the gateway entity 20 for deployment on relevant devices.

Moreover, although FIG. 11 shows the sensor 14 forwarding data to the gateway entity 20 for analysis, the sensor 14 may also forward data directly to the cloud- or third-party processing device 38.

Figure 12:
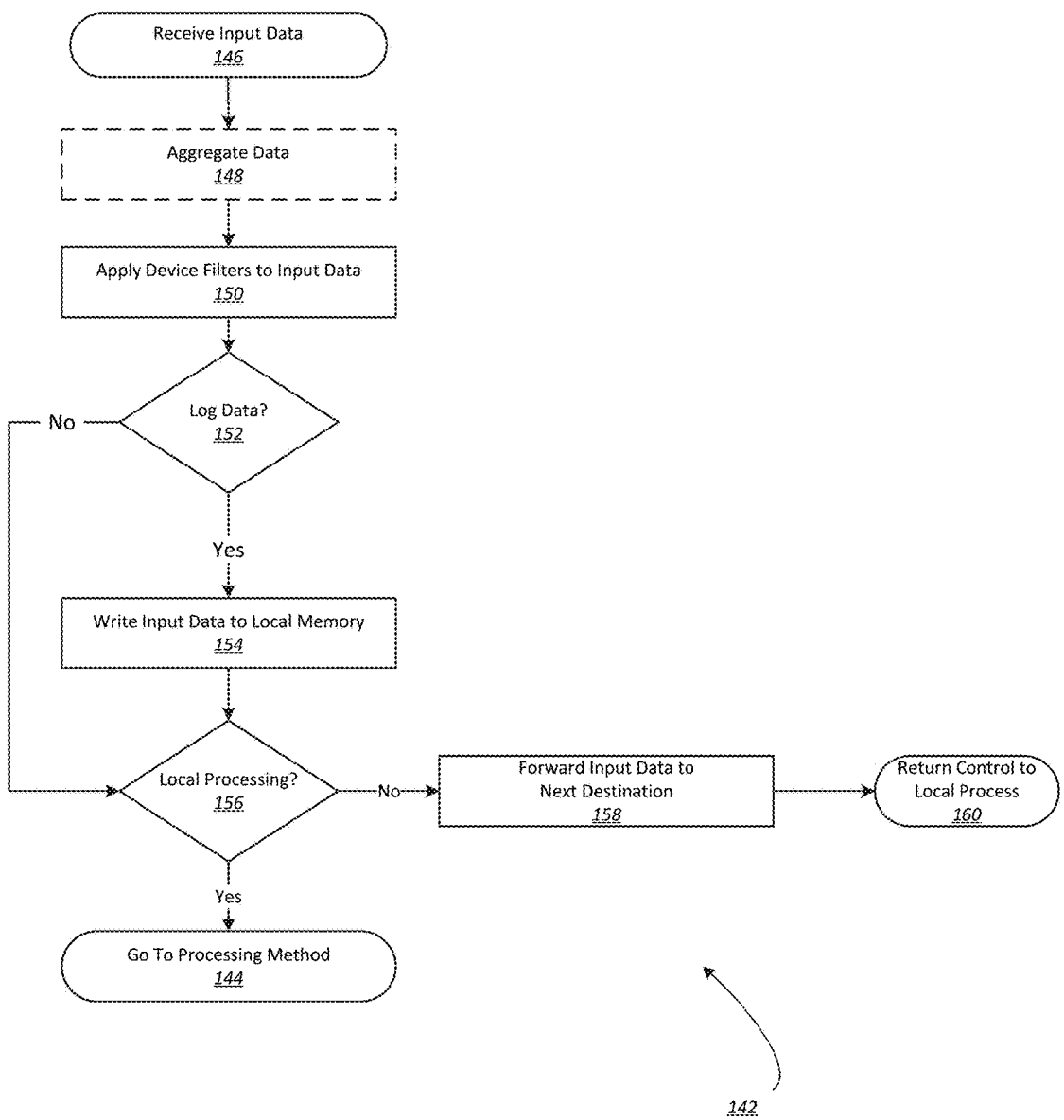
FIG. 12 is a flowchart depicting an exemplary filtering method performed by devices at various hierarchical levels of the architecture in accordance with the present disclosure.
Figure 13:
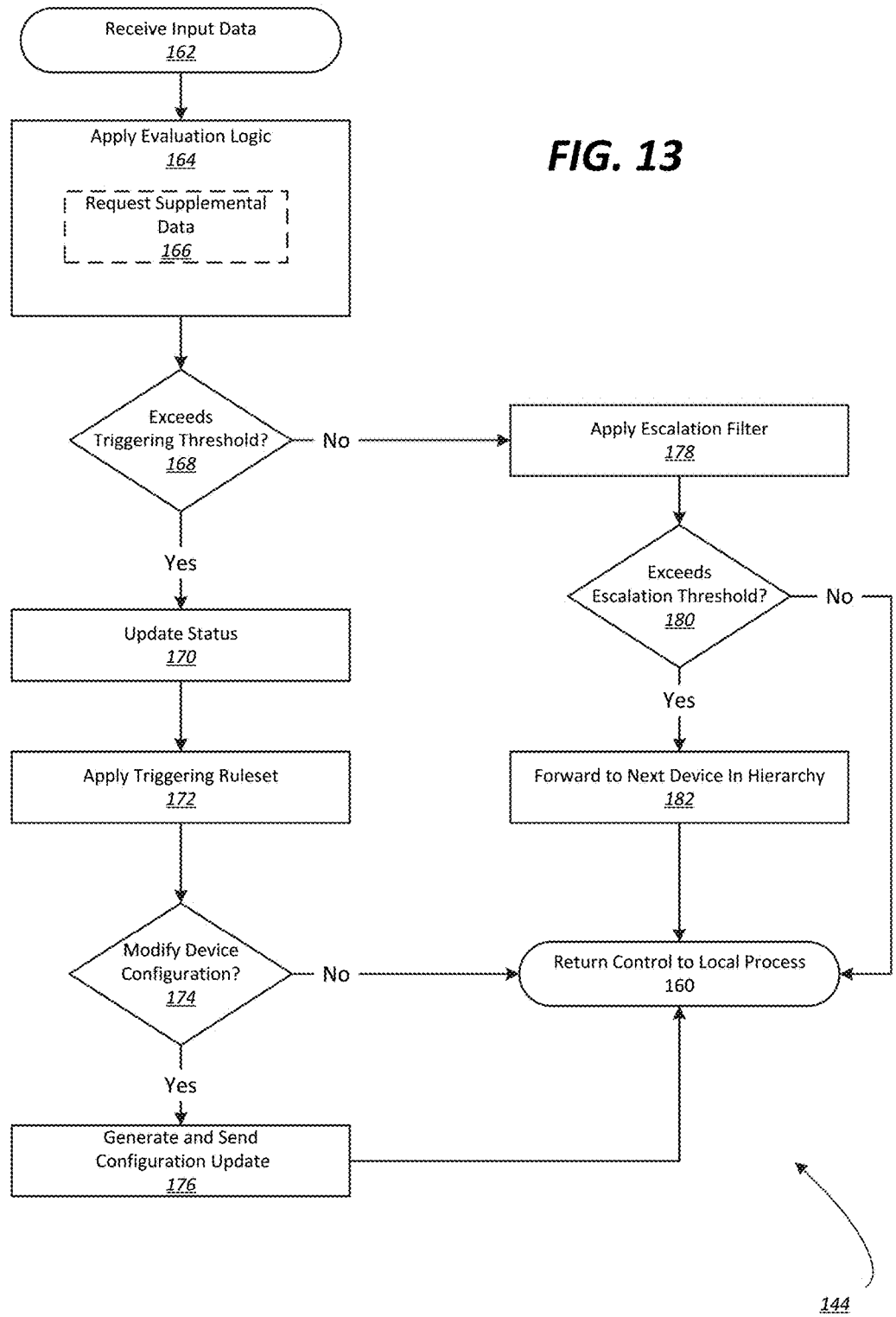
FIG. 13 is a flowchart depicting an exemplary processing method performed by devices at various hierarchical levels of the architecture in accordance with the present disclosure.

FIG. 12 shows the filtration step 142 of FIG. 11 in more detail. The filtration step 142 begins at step 146, where the local device receives input data. For example, if the local device is the primary sensor 14, the input data is retrieved from the data buffer 62. If the local device is the gateway entity 20, the input data is transmitted from the primary sensor 14 and retrieved from the sensor data buffer 76. If the local device is the cloud- or third-party processor 38, the input data is transmitted from the gateway entity 20.

At step 148, the local device may optionally aggregate the data. If the processor of the local device determines that the data can or should be processed in conjunction with other data, then the processor aggregates the input data with the other data. For example, the primary sensor 14 may wait until a predetermined amount of data has been gathered from the detector 48, and may aggregate the predetermined amount of data together. The gateway entity 20 and/or the cloud- or third-party processor 38 may gather together data from multiple sensors of the same type, and process the gathered data as a group. For example, the aggregated data may be retrieved from the sensor data buffer 76 of the gateway entity 20 or the cloud- or third-party processor 38.

The decision as to whether to aggregate the data may depend on the type of data and/or the current security level 136. For example, if the data is high-priority data, or the architecture 10 is currently in an alarm state, then data may be processed as it arrives without waiting for additional data.

At step 150, the local device applies any relevant device filters to the input data, such as a processing determination filter 90. Processing logic in the device filter(s) indicates whether the data should be logged and/or whether the data should be processed locally. Accordingly, at step 152, the processor of the local device determines whether the filter(s) indicate that the data should be logged locally. If the determination at step 152 is yes, then processing proceeds to step 154 and the data is stored in the memory of the local device. The data may be stored for a predetermined amount of time, or until the data is deleted.

Alternatively or in addition, the filter(s) applied at step 150 may indicate that the data should be logged, but at a remote device. Accordingly, at step 154 the data may be forwarded to the remote device for logging.

After the data is either logged, or a determination is made that the data does not need to be logged, processing proceeds to step 156 and the processor determines if the filter(s) applied at step 150 indicate that the data should be processed locally. If not, then processing proceeds to step 158 and the data is forwarded to the next destination. For example, the primary sensor 14 may send the data up one level in the hierarchy 40, to the gateway entity 20. The gateway entity 20 may send the data up one level in the hierarchy 40, to the cloud- or third-party processor 38. Alternatively, the gateway entity 20 may send the data down one level in the hierarchy 40, to a secondary sensor 28 that is capable of processing data of the type generated by the primary sensor 14.

Processing then proceeds to step 160, where control is returned from the filtration process 142 to the local device.

If the determination at step 156 is "YES" (i.e., the local device should process the data), then processing proceeds to step 144, and the data is processed by the local device. Step 144 is shown in more detail in FIG. 13.

The local processing step 144 begins at step 162, by retrieving the input data. For example, the input data may be retrieved from the data buffer 62 or 76, or may be forwarded by the filtration step 142.

Processing then proceeds to step 164, where the local device's processing logic 74 is accessed. The evaluation logic 112 is retrieved from the processing logic and applied to the input data. Optionally, if the evaluation logic 112 determines that supplemental data is needed, the evaluation logic 112 may request the supplemental data from a secondary sensor 28 at step 166. The evaluation logic 112 may indicate, as part of the request, conditions for the supplemental data (such as a time frame for data requested, a type of data requested, etc.).

After the evaluation logic 112 is applied, processing proceeds to step 168 and the local device determines if the processed data exceeds the triggering threshold 118. If so, then a status update is generated in step 170. The status update is sent to the appropriate device(s) in the architecture 10. For example, if the local device is the primary sensor 14 or the cloud- or third-party processor 38, the status update is sent to the gateway entity 20. If the local device is the gateway entity 20, the status update is sent to the monitoring/reporting facility 24 and/or pushed to any relevant devices (e.g., the primary sensor 14, the output device 18, etc.) in communication with the gateway entity.

Processing then proceeds to step 172, and the triggering ruleset 114 is evaluated to determine whether to trigger any output devices. If the determination at step 172 is that one or more output devices should be triggered, then trigger messages are generated and forwarded to the appropriate devices.

Processing then proceeds to step 174, where the local device determines whether any configurations 66 for devices in the architecture 10 should be modified. For example, if the local device is the gateway 20, then the gateway evaluates whether the primary sensor 14 failed to detect an emergency condition (false negative) or detected a condition and sent a status update, but should not have (false positive).

If so, then at step 176 the gateway updates any relevant part of the configuration 66 of the primary sensor 14 (e.g., by altering thresholds, pushing more sophisticated processing logic 72 to the sensor, etc.) in order to improve the sensor's ability to recognize the condition in the future. Alternatively or in addition, the gateway 20 may retrieve a configuration 66 from another entity in the architecture 10 and push the configuration 66 to the primary sensor 14 in an update 84. For example, the gateway 20 may identify that a more up-to-date configuration 66 is available on a secondary sensor 28, and may retrieve the configuration 66 and push it to the primary sensor 14 in a configuration update 84.

If the local device is the cloud- or third-party processor 38, then the local device makes a similar determination at step 174 with respect to the primary sensor 14, but also applies the same process to evaluating the gateway entity 20. If the cloud- or third-party processor 38 determines that the configuration 66 of the primary sensor 14, the gateway entity 20, or both should be updated, then the cloud- or third-party processor 38 may push a configuration update to any affected device at step 176.

Processing then proceeds to step 160, where control is returned from the processing step 144 to the local device.

Returning to step 168, it is possible that the processed data did not exceed the triggering threshold 118. In this case, processing proceeds to step 178, and the local device applies an escalation filter 102 to determine whether the data should nonetheless be forwarded to the next device in the hierarchy 40 for further processing. If it is determined, at step 180, that the processed data exceeds the escalation threshold 108, then the data is forwarded to the next device at step 182. If the determination at step 180 is "NO" (i.e., the data does not exceed the escalation threshold 108), then processing proceeds to step 160 and control is returned from the processing step 144 to the local device.

Figure 14:
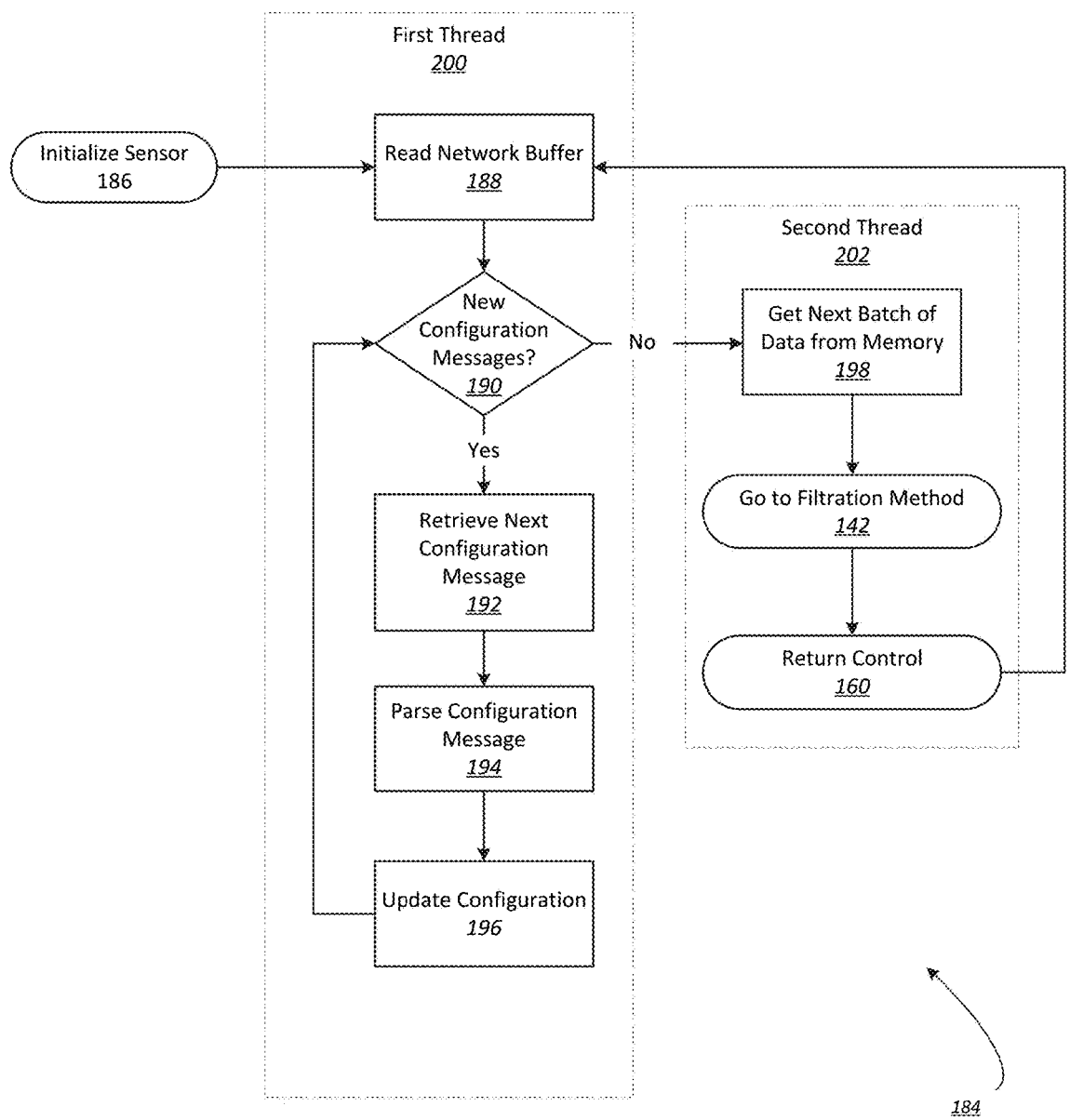
FIG. 14 is a flowchart depicting an exemplary method performed by a sensor device in accordance with the present disclosure.
Figure 15:
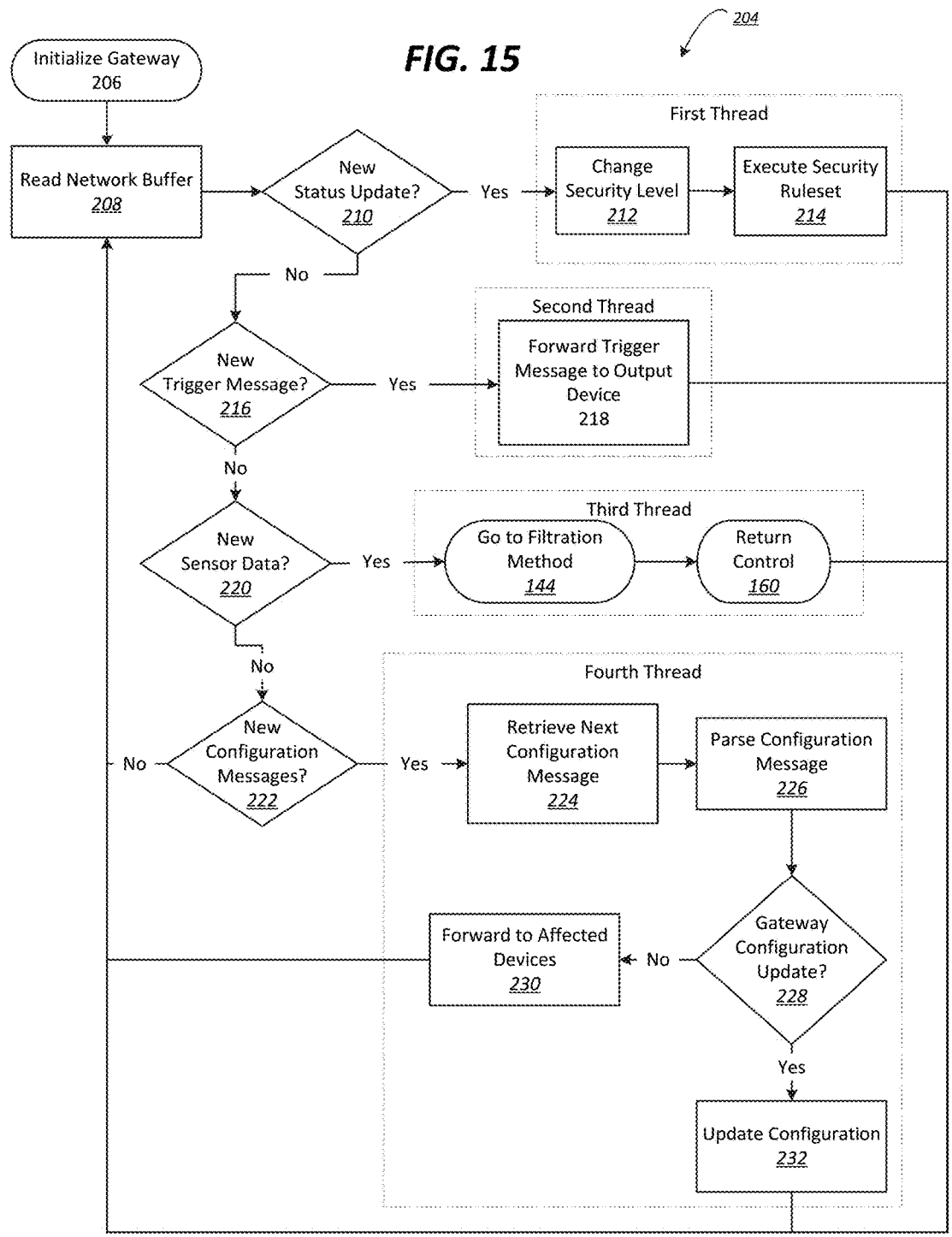
FIG. 15 is a flowchart depicting an exemplary method performed by a gateway entity in accordance with the present disclosure.

The filtration step 142 and the processing step 144 may be used by any device in the architecture 10. FIGS. 14 and 15 give an example of how the steps may be called in the course of operation of the primary sensor 14 and the gateway entity 20, respectively.

FIG. 14 depicts an exemplary operating procedure 184 suitable for use by the primary sensor 14 (and any other sensors in the architecture 10). The procedure begins at step 186, where the sensor is initialized. This may involve, for example, performing system startup checks, loading the default configuration settings 140 from memory, setting any relevant parameters in the configuration 66 based on the default configuration settings 140, initializing the buffers 62, 64, establishing communication with the gateway entity 20 through the communication interface 54, and applying relevant maintenance rules from the maintenance ruleset 132.

Processing then proceeds to step 188, where the sensor 14 checks the network buffer 64 for new messages. If the sensor 14 determines, at step 190, that the network buffer 64 includes a new configuration update 84, then processing proceeds to step 192 and the next configuration message is retrieved from the network buffer 64 for further processing.

At step 194, the retrieved configuration update 84 is parsed to separate the respective elements (e.g., the rules 68, filters 70, processing logic 72, and configuration parameters 74) of the configuration update. For example, if the elements are separated by a designated character, the sensor 14 reads the configuration update 84 until the designated character is reached, and identifies the read data with the appropriate element of the configuration update 84. Alternatively, the header 86 may specify where to find the respective elements of the configuration update 84.

At step 196, each of the respective elements are evaluated to determine how to update the sensor's configuration 66. For example, the sensor determines if the element of the configuration update 84 is a new configuration element, or is a new version of an existing configuration element already deployed on the sensor 14. If no corresponding configuration element exists (e.g., the configuration element is a new rule to be added to the triggering ruleset 114), then the configuration element is added to the configuration 66. If a corresponding configuration element does exist (e.g., the configuration element is a new version of an existing rule in the triggering ruleset 114), then the new configuration element overwrites the old configuration element.

Processing then returns to step 190, where the network buffer 64 is checked for additional configuration update messages.

If the determination at step 190 is "NO" (i.e., no new configuration update messages are present in the network buffer 64), processing proceeds to step 198 and the next batch of data is retrieved from the data buffer 62. The filtration process 142 is applied to the retrieved data, which may result in the data being forwarded to another device for processing, or processing the data locally at the sensor 14.

When control returns to the operating procedure 184 (at step 160), the operating procedure reverts to step 188 and checks the network buffer 64 for additional configuration update messages.

Some or all of the steps of the operating procedure 184 may be performed in parallel, if the processor 50 of the sensor 14 supports parallel processing. For example, FIG. 14 separates the steps used to update the sensor's configuration 66 from the steps used to process the sensor data. The configuration update steps are performed in a first thread 200, and the sensor data processing steps are performed in a second thread 202. If steps of the operating procedure 184 are to be performed in parallel, then the initialization step 186 may include creating new threads for each parallel set of procedures.

FIG. 15 depicts a corresponding operating procedure 204 suitable for performance by a gateway entity 20. The procedure 204 begins at step 206, when the gateway 20 is initialized. This may involve, for example, performing system startup checks, loading the default configuration settings 140 from memory, setting any relevant parameters in the configuration 66 based on the default configuration settings 140, initializing the data buffers 62, 64, establishing communication with devices in the connected device list 120, and applying relevant maintenance rules from the maintenance ruleset 132.

Processing then proceeds to step 208, where the network buffer 64 is checked to determine if there are any pending messages for evaluation. Because the gateway entity 20 handles many different types of messages, the messages are be classified at steps 210, 216, 220, and 222. The different types of messages are handled in order of priority (e.g., messages having status updates, which could include an alarm condition, may be processed before messages having new sensor data for processing).

At step 210, the gateway entity 20 determines if there is a status update message pending. If so, processing proceeds to step 212 and the status update is processed. If the security level 136 is changed by the status update, the gateway entity 20 may update the security level 136. Processing then proceeds to step 214, and the security ruleset 134 is evaluated/executed. Once the status update message is addressed, processing then returns to step 208 and the network buffer 64 is checked for additional messages.

At step 216, the gateway entity 20 determines if there is a new trigger message pending. If so, processing proceeds to step 218 and the gateway entity forwards the trigger message to affected output devices. Processing then returns to step 208 and the network buffer 64 is checked for additional messages.

At step 220, the gateway entity 20 determines if there is new sensor data to be processed. If so, processing proceeds to step 144 and the gateway entity's filtration method is performed. After the sensor data is processed and control is returned to the operating procedure 204 at step 160, processing returns to step 208 and the network buffer 64 is checked for additional messages.

At step 222, the gateway entity 20 determines if there are any configuration messages pending. If so, processing proceeds to step 224 and the next configuration update 84 is retrieved from the network buffer 84. The configuration update 84 is parsed at step 226 in a manner similar to the one previously described with respect to step 194 in FIG. 14.

At step 228, the gateway entity 20 consults the header 86 of the configuration update 84 to determine which device(s) are affected by the configuration update. If the gateway entity 20 determines that the configuration update 84 is directed to other devices in the architecture 10, then the gateway entity forwards the configuration update 84 to those other devices at step 230. Processing then returns to step 208 and the network buffer 64 is checked for additional messages.

If the gateway entity 20 determines at step 228 that the configuration update 84 affects at least the gateway entity 20, then processing may proceed to step 232 and the gateway entity 20 updates its configuration 66. Step 232 may proceed in a similar manner to step 196, previously described in connection with FIG. 14. Processing then returns to step 208 and the network buffer 64 is checked for additional messages.

If, at step 228, the gateway entity 20 determines that the configuration update 84 affects both the gateway entity 20 and at least one other device, then both of steps 230 and 232 are performed. Processing then returns to step 208.

Some or all of the steps of the operating procedure 204 may be performed in parallel. FIG. 15 depicts an exemplary embodiment in which the status updates are processed in a first thread, trigger messages are processed in a second thread, sensor data is processed in a third thread, and status updates are processed in a fourth thread. If steps of the operating procedure 184 are to be performed in parallel, then the initialization step 206 may include creating new threads for each parallel set of procedures.

The exemplary procedures described in FIGS. 11-15 may form part of the architecture management process 82. These procedures may be supplemented with additional procedures as needed or applicable.

Using the above described embodiments, processing jobs in the architecture 10 may be performed at lower levels of the hierarchy 40 when possible, saving processing resources at the gateway entity 20. Moreover, complex processing tasks may be performed at higher levels of the hierarchy 40, allowing more complicated data analysis to be performed. Different processing logic 72 may be performed on different devices in the architecture 10, allowing specialized processing to occur. Moreover, improvements may be developed at any level of the hierarchy 40 and pushed to other devices in real-time. The improvements may be dynamically generated in response to real-world processing results, allowing the processing logic 72 to be fine-tuned as processing occurs.

As used herein, an element or step recited in the singular and proceeded with the word "a" or "an" should be understood as not excluding plural elements or steps, unless such exclusion is explicitly recited. Furthermore, references to "one embodiment" are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A method comprising:
 receiving, at a gateway entity comprising a processor, input data from a primary sensor communicatively coupled to the gateway entity;
 determining, using the processor of the gateway entity, whether to process the data locally at the gateway entity or to forward the data to another device communicatively coupled to the gateway entity, wherein the other device includes processing logic for processing the input data that is different from processing logic applied by the gateway entity; and
 if the processor determines that the input data should be processed locally, the processor processes the data, generates an action to be taken in response to the input data, and forwards the action to an output device communicatively coupled to the gateway entity, or if the processor determines that the input data should not be processed locally, the gateway entity forwards the input data to the other device, receives an action to be taken in response to the input data from the other device, and forwards the action to the output device; and
 combining data from a secondary sensor with the input data from the primary sensor and when the combined data is evaluated holistically, determining whether to change a state of an architecture comprising the gateway entity or a trigger a follow-up action.

2. The method of claim 1, further comprising requesting supplemental data from the secondary sensor, which is distinct from the primary sensor, wherein processing the input data is performed based, at least in part, on the supplemental data.

3. The method of claim 1, wherein the sensor is present in a monitored zone, and the output device to which the action is sent is present in an external zone that is distinct from the monitored zone.

4. The method of claim 1, wherein the processor of the gateway entity provides, as an output to the secondary sensor, unprocessed data from other sensors.

5. The method of claim 1, wherein the processor of the gateway entity generates, in response to processing the input data, a configuration update that changes a manner in which the sensor processes future data, and forwards the configuration update to the sensor.

6. The method of claim 1, wherein the determining is performed by using data from the secondary sensor to filter out noise from the input data.

7. An apparatus comprising:
 a detector for generating input data;
 a non-transitory computer-readable storage medium storing: an identifier of a connected device that is capable of processing the input data, and processing logic for processing the input data locally at the apparatus, wherein the connected device stores connected device processing logic for processing the input data, and the processing logic stored on the apparatus is different than the connected device processing logic;
 a communication interface communicatively coupled to the connected device; and
 a processor configured to: determine whether to process the input data locally at the apparatus, and process the input data locally using the processor when the processor determines that the input data should be processed locally, or forward the input data to the connected device when the processor determines that the data should not be processed locally at the apparatus, wherein the processor combines data from a secondary sensor with the input data and the connected device processing logic determines whether to change a state of an architecture comprising the apparatus or a trigger a follow-up action.

8. The apparatus of claim 7, wherein the apparatus and the connected device are parts of an architecture arranged into a hierarchy having at least two levels, and the connected device is either: another device at a same level of the hierarchy as the apparatus and having specialized processing logic for processing the input data, or is at a higher level of the hierarchy as compared to the apparatus.

9. The apparatus of claim 7, wherein: the input data is processed at the connected device, and the connected device requests supplemental data from the secondary sensor.

10. The apparatus of claim 7, wherein the storage medium further stores a configuration that is referenced by the processing logic in order to process the input data.

11. The apparatus of claim 7, wherein: the communication interface is configured to receive a configuration update from the connected device, and the processor applies the configuration update to change a manner in which the processor processes future data from the detector.

12. The apparatus of claim 7, wherein: the input data is processed locally at the apparatus, and the processor makes a determination that a result of the processing does not trigger an action but comes within a predefined tolerance of triggering the action, and the input data is forwarded to the connected device for further processing in response to the determination.

13. The apparatus of claim 7, wherein: the input data is processed locally at the apparatus, and the processor makes a determination that a result of the processing triggers an action by an output device, and the processor generates a trigger for the output device in response to the determination.

14. An apparatus comprising:
a communication interface communicatively coupled to a sensor for receiving input data from the sensor;
a non-transitory computer-readable storage medium storing: an identifier of a cloud processing device capable of processing the input data, and processing logic for processing the input data locally at the apparatus; and
a processor configured to: determine whether to process the input data locally at the apparatus or forward the input data to the cloud processing device, and process the input data locally by applying the processor logic when the processor determines that the input data should be processed locally, or forward the input data to the cloud processing device when the processor determines that the input data should be processed at the cloud processing device, wherein the processor combines data from a secondary sensor with the input data and sends the combined data to the cloud processing device to be evaluated holistically.

15. The apparatus of claim 14, wherein: the processing logic stored on the storage medium of the apparatus is different than sensor processing logic stored on the sensor from which the data is received or the processing logic stored on the storage medium of the apparatus is different than cloud processing logic stored on the cloud processing device to which the data is forwarded.

16. The apparatus of claim 15, wherein the processing logic stored on the storage medium causes a different action to be taken in response to the data compared to the sensor processing logic or cloud processing logic stored on the cloud processing device.

17. The apparatus of claim 15, wherein the apparatus is part of an architecture arranged into a hierarchy having at least two levels, and the cloud processing device is a third-party device distinct from the apparatus, wherein the cloud processing device determines that a configures of the architecture is to be updated.

18. The apparatus of claim 14, wherein the processor is further configured to send the input data to the cloud processing device and the cloud processing device determines whether to send a status change message or a null status message to the apparatus.

19. The apparatus of claim 14, wherein: the input data is processed at the cloud processing device, and the cloud processing device requests supplemental data from the secondary sensor.

20. The apparatus of claim 14, wherein: the processing logic is further configured to generate a configuration update in response to the input data, the configuration update changing a manner in which the sensor processes future data; and the communication interface forwards the configuration update to the sensor.

* * * * *

UNITED STATES PATENT AND TRADEMARK OFFICE
CERTIFICATE OF CORRECTION

PATENT NO. : 10,397,042 B2
APPLICATION NO. : 16/109979
DATED : August 27, 2019
INVENTOR(S) : Jason A. Breed et al.

It is certified that error appears in the above-identified patent and that said Letters Patent is hereby corrected as shown below:

In the Specification

Column 1, Line 11, replace "Architecture,"" with -- Architecture," now Pat No. 10,084,638, --
Column 7, Line 5, replace "throug" with -- through --
Column 32, Line 12, replace "be classified" with -- being classified --

Signed and Sealed this
Twelfth Day of November, 2019

Andrei Iancu
*Director of the United States Patent and Trademark Office*